(12) United States Patent
Miloseski et al.

(10) Patent No.: US 11,159,671 B2
(45) Date of Patent: Oct. 26, 2021

(54) USER INTERFACE FOR SURFACING CONTEXTUAL ACTIONS IN A MOBILE COMPUTING DEVICE

(71) Applicant: Palm Ventures Group, Inc., San Francisco, CA (US)

(72) Inventors: Dennis Miloseski, Danville, CA (US); Howard Nuk, San Francisco, CA (US); David Woodland, Walnut Creek, CA (US)

(73) Assignee: Palm Ventures Group, Inc., San Francisco, CA (US)

(*) Notice: Subject to any disclaimer, the term of this patent is extended or adjusted under 35 U.S.C. 154(b) by 36 days.

(21) Appl. No.: 16/028,337

(22) Filed: Jul. 5, 2018

(65) Prior Publication Data

US 2019/0014205 A1    Jan. 10, 2019

Related U.S. Application Data

(60) Provisional application No. 62/528,802, filed on Jul. 5, 2017.

(51) Int. Cl.
*H04M 1/72451* (2021.01)
*G06F 3/0481* (2013.01)
(Continued)

(52) U.S. Cl.
CPC ...... *H04M 1/72451* (2021.01); *G06F 3/0482* (2013.01); *G06F 3/04817* (2013.01);
(Continued)

(58) Field of Classification Search
CPC .............. G06F 3/04817; G06F 3/0482; H04M 1/72566; H04M 1/72583; H04M 1/72569;
(Continued)

(56) References Cited

U.S. PATENT DOCUMENTS

| | | | |
|---|---|---|---|
| 8,386,506 B2* | 2/2013 | Martinez | H04L 67/306 707/759 |
| 9,443,272 B2* | 9/2016 | Wan | G06Q 10/1093 |

(Continued)

FOREIGN PATENT DOCUMENTS

| | | |
|---|---|---|
| EP | 3154014 A1 | 4/2017 |
| JP | 2014518409 A | 7/2014 |

(Continued)

OTHER PUBLICATIONS

PCT International Search Report and Written Opinion Application No. PCT/US18/40950, dated Sep. 20, 2018.

(Continued)

*Primary Examiner* — Tadesse Hailu
(74) *Attorney, Agent, or Firm* — Patent Law Works LLP

(57) ABSTRACT

A system and method for surfacing tailored actionable items associated with applications in a user experience of a mobile computing device is disclosed. The method includes determining an event associated with a application, determining an action library including a plurality of actionable items, identifying, from the action library, one or more actionable items associated with one or more applications based on the event, generating an action menu based on the one or more actionable items, the action menu including a deep link to perform the one or more actionable items, and presenting the action menu in association with the application in response to the event.

20 Claims, 17 Drawing Sheets

(51) Int. Cl.
  *G06F 3/0482* (2013.01)
  *H04M 1/72469* (2021.01)
  *H04M 1/72454* (2021.01)
  *H04M 1/72484* (2021.01)

(52) U.S. Cl.
  CPC .... *H04M 1/72469* (2021.01); *H04M 1/72454* (2021.01); *H04M 1/72484* (2021.01)

(58) Field of Classification Search
  CPC ......... H04M 1/72597; H04M 1/72451; H04M 1/72469; H04M 1/72484; H04M 1/72454
  See application file for complete search history.

(56) References Cited

U.S. PATENT DOCUMENTS

| | | | |
|---|---|---|---|
| 9,465,682 | B1 | 10/2016 | Powell et al. |
| 9,832,751 | B2* | 11/2017 | Robinson, Jr. ........ H04W 64/00 |
| 9,946,782 | B2* | 4/2018 | Davis ................ G06Q 30/02 |
| 2009/0132197 | A1 | 5/2009 | Rubin et al. |
| 2009/0164942 | A1* | 6/2009 | Laaksonen ............ G06F 9/543 |
| | | | 715/810 |
| 2014/0033071 | A1* | 1/2014 | Gruber ................ G06F 3/0488 |
| | | | 715/752 |
| 2014/0100835 | A1 | 4/2014 | Majumdar et al. |
| 2014/0282254 | A1 | 9/2014 | Feiereisen et al. |
| 2015/0149469 | A1* | 5/2015 | Xu ....................... H04L 65/403 |
| | | | 707/740 |
| 2015/0156061 | A1 | 6/2015 | Saxena et al. |
| 2016/0259717 | A1* | 9/2016 | Nychis ................ G06F 16/9535 |
| 2016/0350671 | A1* | 12/2016 | Morris, II .......... G05B 23/0229 |
| 2016/0360336 | A1* | 12/2016 | Gross ................ H04M 1/72403 |
| 2017/0006135 | A1* | 1/2017 | Siebel .................... H04L 69/40 |
| 2017/0344195 | A1* | 11/2017 | Thomas ............. H04N 21/4751 |
| 2018/0218287 | A1* | 8/2018 | Wang .................... G06N 20/00 |

FOREIGN PATENT DOCUMENTS

| | | |
|---|---|---|
| JP | 2013-045190 A | 6/2015 |
| JP | 2016523403 A | 8/2016 |
| JP | 2017516163 A | 6/2017 |
| WO | 2012167168 A2 | 12/2012 |
| WO | 2014197418 A1 | 12/2014 |
| WO | 2016144975 A2 | 9/2016 |

OTHER PUBLICATIONS

Extended European Search Report for EP Application No. 18828919.3, dated Feb. 9, 2021, 13 pgs.

Office Action for JP Application No. 2020-50654, dated Feb. 22, 2021, 13 pgs. (with translation).

Azim, Tanzirul et al., "uLink: Enabling User-Defined Deep Linking to App Content", MobiSys'16, Jun. 25-30, 2016, Singapore, pp. 305-318.

Office Action for KR Application No. 10-2020-7003052, dated Apr. 15, 2021, 14 pgs. (with translation).

* cited by examiner ized by the background section, as well as aspects of the
USER INTERFACE FOR SURFACING CONTEXTUAL ACTIONS IN A MOBILE COMPUTING DEVICE

CROSS REFERENCE TO RELATED APPLICATIONS

The present application claims priority under 35 U.S.C. § 119 of U.S. Provisional Patent Application No. 62/528,802, filed Jul. 5, 2017, and entitled "Ultra-Portable Personal Computing and Communication Device (Companion Device) and Associated User Interfaces," which is incorporated by reference in its entirety.

BACKGROUND

Field of the Invention

The specification generally relates to surfacing tailored actions associated with one or more applications on a mobile computing device. In particular, the specification relates to a system and method for improving user experience with the mobile computing device by automatically surfacing the tailored actions in the user interface of the mobile computing device based on context.

Description of the Background Art

The application ecosystem of mobile computing devices has become complex. There appears to be an application for everything. Furthermore, additional functionality is constantly being added to each application to increase user interaction with the application and functionality provided by the application. Typically, the operating system in mobile computing devices requires traversal of several layers of menus or web pages to access the functionality or data deep within the pages of an application. As a consequence, user experience is often cumbersome and inefficient. For example, the user has to launch the application and navigate the application by making various selections to access a desired function or data within the application. This reduces user productivity because the user spends more valuable time launching the application and traversing longer through menus and web pages to access the application. Additionally, it is difficult to navigate the application to access and initiate the desired function in a timely manner in mobile computing devices with a small form factor. It is important to improve the accessibility and ease of initiating actions associated with the applications in mobile computing devices.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The techniques introduced herein overcome the deficiencies and limitations of the existing solutions, at least in part, with a system and method for surfacing tailored actionable items associated with applications in a user experience of a mobile computing device.

According to one innovative aspect of the subject matter described in this disclosure, a computer-implemented method comprises: determining an event associated with a first application; determining an action library including a plurality of actionable items; identifying, from the action library, a first actionable item associated with the first application based on the event; generating a first action menu based on the first actionable item, the first action menu including a first deep link to perform the first actionable item; and presenting the first action menu in association with the first application in response to the event.

In general, another innovative aspect of the subject matter described in this disclosure may be embodied in systems comprising: one or more processors; a memory storing instructions, which when executed cause the one or more processors to: determine an event associated with a first application; determine an action library including a plurality of actionable items; identify, from the action library, a first actionable item associated with the first application based on the event; generate a first action menu based on the first actionable item, the first action menu including a first deep link to perform the first actionable item; and present the first action menu in association with the first application in response to the event.

In general, another innovative aspect of the subject matter described in this disclosure may be embodied in computer-implemented methods comprising: receiving a signal stream from a mobile computing device; processing the signal stream; detecting an activity and a context of the activity based on the processed signal stream; determining an action library including a plurality of actionable items associated with one or more applications; determining an actionable item relating to the activity and the context of the activity from the action library; generating, an action menu including a direct link to perform the actionable item; and presenting the action menu in association with the detected activity.

In general, another innovative aspect of the subject matter described in this disclosure may be embodied in computer-implemented methods comprising: receiving a prolonged selection of a first application in association with an application launcher, determining a category of the first application; determining an action library including a plurality of actionable items associated with the category; determining a first actionable item associated with the first application from the action library; determining a second actionable item associated with a second application from the action library based on an action category of the second actionable item matching the category of the first application; generating an action menu based on the first actionable item and the second actionable item, the action menu including a first deep link to perform the first actionable item and a second deep link to perform the second actionable item; and presenting the action menu in association with the first application in response to the prolonged selection of the first application.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
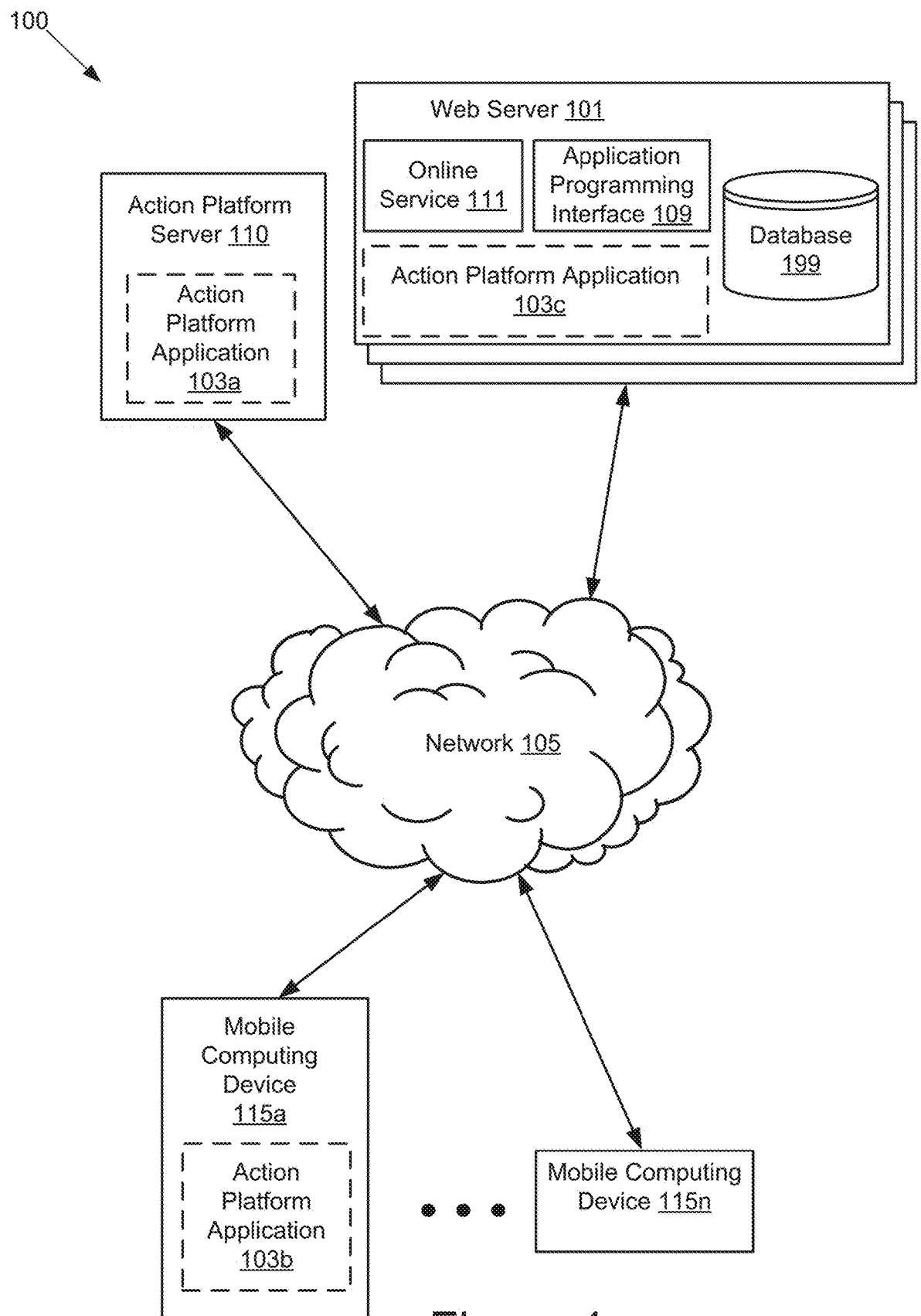
FIG. 1 is a high-level block diagram illustrating one embodiment of a system for surfacing tailored actionable items associated with applications in a user experience of a mobile computing device.

FIG. 1 is a high-level block diagram illustrating one embodiment of a system 100 for surfacing tailored actionable items associated with applications in a user experience of a mobile computing device 115. The illustrated system 100 may have one or more mobile computing devices 115a ... 115n, which can be accessed by users, an action platform server 110, and a plurality of web servers 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the mobile computing devices 115, the action platform server 110 and the web server 101, in practice one or more networks 105 can be connected to these entities.

In some embodiments, the system 100 includes a plurality of web servers 101 coupled to the network 105 for communication with the other components of the system 100, such as the plurality of mobile computing devices 115 and the action platform server 110. A web server 101 may be, or may be implemented by, a computing device including a processor, a memory, applications, a database, and network communication capabilities. The web server 101 may be a Hypertext Transfer Protocol (HTTP) server, a Representational State Transfer (REST) service, or other server type, having structure and/or functionality for processing and satisfying content requests and/or receiving content from one or more mobile computing devices 115 that are coupled to the network 105. In some embodiments, the web server 101 includes an online service 111 dedicated to providing access to various services and information resources hosted by the web server 101 via web, mobile, and/or cloud applications on the one or more mobile computing devices 115.

The online service 111 may obtain and store user data, content items (e.g., videos, text, images, etc.), and interaction data reflecting the interaction of users with the content items. User data, as described herein, may include one or more of user profile information (e.g., user id, user preferences, user history, etc.), logged information (e.g., clickstream, IP addresses, user device specific information, historical actions, etc.), and other user specific information. In some embodiments, the online service 111 allows users to share content with other users (e.g., friends, contacts, public, similar users, etc.), purchase and/or view items (e.g., books, movies, videos, music, games, merchandise, flights, hotels, etc.), and other similar actions. For example, the online service 111 may be a music streaming service, a web mapping service, a multimedia messaging service, an electronic mail service, a news service, a news aggregator service, a social network, a photo and video-sharing social networking service, a ridesharing service, an online banking service, a cloud storage service, an online information database service, a travel service, an online e-commerce marketplace, a ratings and review service, a restaurant-reservation service, a food delivery service, a search service, a health and fitness service, home automation and security, Internet of Things (IOT), etc. It should be noted that the list of items provided as examples for the online service 111 above are not exhaustive and that others are contemplated in the techniques described herein.

In some embodiments, the web server 101 sends and receives data to and from other entities of the system 100 via the network 105. In the example of FIG. 1, the components of the web server 101 are configured to implement an application programming interface (API) 109. For example, the API 109 may be a software interface exposed over the HTTP protocol by the web server 101. The API 109 includes a set of requirements that govern and facilitate the movement of information between the components of FIG. 1. For example, the API 109 exposes internal data and functionality of the online service 111 hosted by the web server 101 to API requests originating from the action platform application 103*b* implemented on the mobile computing device 115. Via the API 109, the action platform application 103*b* passes the information along with a set of parameters that needs servicing to an internal function of the online service 111 and then returns an object (e.g., XML or JSON) with associated results to the mobile computing device 115. The web server 101 may include a database 199. The database 199 may be a separate entity coupled to the web server 101 over the network 105 to store structured data in a relational database and a file system (e.g., HDFS, NFS, etc) for unstructured or semi-structured data. In some embodiments, the web server 101 may be configured to implement the action platform application 103*c*. It should be understood that the web server 101 and the application programming interface 109 may be representative of one online service provider and that there may be multiple online service providers coupled to network 105, each having its own server or a server cluster, applications, application programming interface, and database 199.

The action platform server 110 may be configured to implement the action platform application 103*a* described in detail below with reference to FIGS. 2A, 2B and 3. In some embodiments, the action platform server 110 is a backend hardware or software server that receives and processes information and analytics from the plurality of mobile computing devices 115. Although, only a single action platform server 110 is shown in FIG. 1, it should be understood that there may be any number of action platform servers 110 or a server cluster, which may be load balanced.

In some embodiments, the servers 101 and 110 may each be a hardware server, a software server, or a combination of software and hardware. In some implementations, the servers 101 and 110 may each be one or more computing devices having data processing (e.g., at least one processor), storage (e.g., a pool of shared or unshared memory), and communication capabilities. For example, the servers 101 and 110 may include one or more hardware servers, server arrays, storage devices and/or systems, etc. Also, instead of or in addition, the servers 101 and 110 may each implement their own API for the transmission of instructions, data, results, and other information between the servers 101 and 110 and an application installed or otherwise implemented on the mobile computing device 115. In some implementations, the servers 101 and 110 may include one or more virtual servers, which operate in a host server environment and access the physical hardware of the host server including, for example, a processor, memory, storage, network interfaces, etc., via an abstraction layer (e.g., a virtual machine manager).

In some embodiments, the mobile computing device 115 may be an ultra-portable computing device having a small form factor with data processing and communication capabilities. The mobile computing device 115 may include a memory, a processor, a camera, a communication unit capable of accessing the network 105, a power source, and/or other software and/or hardware components, such as a display (for viewing information provided by the web server 101 via API 109), graphics processor unit (for handling general graphics and multimedia processing), sensor (s), sensor hub, firmware, operating systems, drivers, a subscriber identification module (SIM) or other integrated circuit to support cellular communication, and various physical connection interfaces (e.g., USB, USB-C, USB Micro, etc.). In some embodiments, the mobile computing device 115 may be a companion device to other primary computing devices (not shown), for example a laptop computer, a desktop computer, a tablet computer, a mobile telephone, a smartphone, a personal digital assistant (PDA), a mobile email device, a portable game player, a portable music player, a television with one or more processors embedded therein or coupled thereto, a webcam, a user wearable computing device or any other electronic device capable of accessing the network 105, etc.

In some embodiments, the mobile computing device 115 may synchronize its data (e.g., emails, text messages, calendar, documents, address book, files, etc.) over the network 105 with the other primary computing devices to which it is a companion device. In some embodiments, the mobile computing device 115 may be the primary computing device to the same or different type of companion device. The mobile computing device 115 may include a browser application through which the mobile computing device 115 interacts with the online service 111 hosted by the web server 101, an application (e.g., HTML5 based mobile application) installed enabling the mobile computing device 115 to couple and interact with the online service 111 hosted by the web server 101, or may couple with the web server 101 in some other way. In some embodiments, a single user may use more than one mobile computing device 115, which the action platform server 110 may track and accordingly provide the functionality as described herein. For example, the action platform server 110 may track the behavior of a user across multiple mobile computing devices 115. While FIG. 1 illustrates two mobile computing devices 115*a* and 115*n*, the disclosure applies to a system architecture having one or more mobile computing devices 115. In addition, the mobile computing devices 115*a* and 115*n* may be the same or different types of mobile computing devices.

The action platform application 103 may include software and/or logic to provide the functionality for surfacing tailored actionable items related to one or more applications in a user experience of the mobile computing device 115 based on context. In some embodiments, the action platform application 103 can be implemented using programmable or specialized hardware, such as a field-programmable gate array (FPGA) or an application-specific integrated circuit (ASIC). In some embodiments, the action platform application 103 can be implemented using a combination of hardware and software. In other embodiments, the action platform application 103 may be stored and executed on a combination of the mobile computing devices 115 and the action platform server 110, or by any one of the mobile computing devices 115 or action platform server 110.

As depicted in FIG. 1, the action platform application 103*a* and 103*b* is shown in dotted lines to indicate that the operations performed by the action platform application 103*a* and 103*b* as described herein can be performed at the mobile computing device 115, the action platform server 110, or any combinations of these components. In some embodiments, each instance 103*a* and 103*b* may comprise one or more components of the action platform application 103 depicted in FIGS. 2A and 2B, and may be configured to fully or partially perform the functionalities described herein depending on where the instance resides. Additional structure, acts, and/or functionality of the action platform application 103 is described in further detail below with respect to at least FIGS. 2A, 2B and 3. While the action platform application 103 is described below as a stand-alone action platform application, in some embodiments, the action platform application 103 may be part of other applications in operation on the mobile computing device 115 and the action platform server 110.

In some embodiments, the action platform application 103b may be a thin-client application with some functionality executed on the mobile computing device 115 and additional functionality executed on the action platform server 110 by the action platform application 103a. For example, the action platform application 103b on the mobile computing device 115 could include software and/or logic for archiving a history of user interactions with one or more applications loaded on the mobile computing device 115, for example on a daily basis, determining actionable items associated with the one or more applications, for example commonly accessed functionalities, building an action library including a plurality of actionable items of the one or more applications, tailoring the actionable items and surfacing the tailored actionable items in the user experience of the mobile computing device 115 on-the-go based on context. In another example, the action platform application 103a on the web server 101 could include software and/or logic for preparing learning data and training one or more action models using the learning data. The operation of the action platform application 103 and the functions listed above are described below in more detail below with reference to FIGS. 2-16.

Figure 2A:
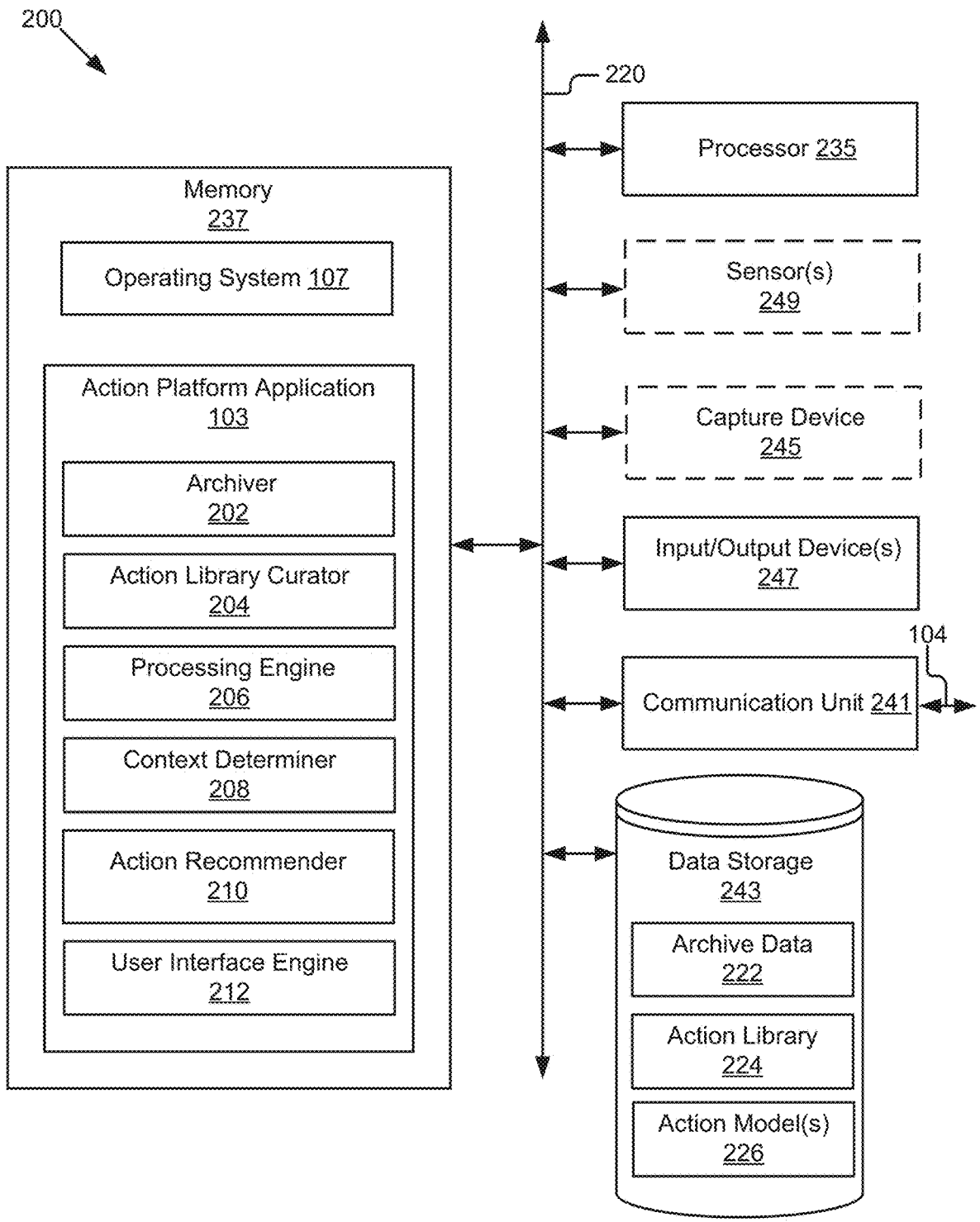
FIG. 2A is a block diagram illustrating one embodiment of a computing device including an action platform application.

FIG. 2A is a block diagram illustrating one embodiment of a computing device 200 including an action platform application 103. The computing device 200 may also include a processor 235, a memory 237, a communication unit 241, data storage 243, an optional capture device 245, input/output device(s) 247, and sensor(s) 249 according to some examples. The memory 237 may include one or more of the operating system 107 and the action platform application 103. The components of the computing device 200 are communicatively coupled by a bus 220. In some embodiments, the computing device 200 may be representative of the mobile computing device 115, the action platform server 110, the web server 101 or a combination of the mobile computing device 115, the web server 101 and the action platform server 110. In such embodiments where the computing device 200 is representative of the mobile computing device 115, the web server 101 or the action platform server 110, it should be understood that the mobile computing device 115, the web server 101 and the action platform server 110 may include other components described above but not shown in FIG. 2A.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the action platform application 103, and the data storage 243. In some implementations, the processor 235 may be coupled to a low-power secondary processor (e.g., sensor hub) included on the same integrated circuit or on a separate integrated circuit. This secondary processor may be dedicated to performing low-level computation at low power. For example, the secondary processor can perform step counting, sensor fusion, sensor batching, etc. in accordance with the instructions received from the action platform application 103.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. The memory 237 is also capable of storing other instructions and data, including, for example, an operating system, hardware drivers, other software applications, databases, etc. The memory 237 may be coupled to the bus 220 for communication with the processor 235, the communication unit 241, the data storage 243 and/or the other components of the computing device 200.

The memory 237 may include one or more non-transitory computer-usable (e.g., readable, writeable) medium, which can be any tangible non-transitory apparatus or device that can contain, store, communicate, propagate or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.). It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 can include a communication bus for transferring data between components of the computing device 200 or between the computing device 200 and other components of the system via the network 105 or portions thereof, a processor mesh, a combination thereof, etc. In some implementations, the action platform application 103 and the operating system 107 may cooperate and communicate via a software communication mechanism implemented in association with the bus 220. The software communication mechanism can include and/or facilitate, for example, inter-process communication, local function or procedure calls, remote procedure calls, network-based communication, secure communication, etc.

The communication unit 241 is hardware for receiving and transmitting data by linking the processor 235 to the network 105 and other processing systems. The communication unit 241 receives data such as requests from the mobile computing device 115 and transmits the requests to the web server 101. The communication unit 241 also transmits information to the mobile computing device 115 for display, for example, in response to processing the requests. The communication unit 241 is coupled to the bus 220. The communication unit 241 may include one or more interface devices for wired and wireless connectivity with the network 105 and the other entities and/or components of the system 100 including, for example, the web server 101, the mobile computing devices 115, and the action platform server 110. For instance, the communication unit 241 may include, but is not limited to, cable interfaces (e.g., CAT-5); wireless transceivers for sending and receiving data using Wi-Fi™; Bluetooth®, Near-field communication (NFC), cellular communications, etc.; universal serial bus (USB) interfaces; various combinations thereof; etc. The communication unit 241 may be coupled to the network 105 via the signal line 104.

In another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. The communication unit 241 may also provide other conventional connections to the network 105 for distribution of files and/or media objects using standard network protocols such as TCP/IP, HTTP, HTTPS, and SMTP or any combination thereof.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The data storage 243 is communicatively coupled to the bus 220. In some embodiments, the data storage 243 may be coupled to the components 235, 237, 241, 245, or 249 of the computing device 200 via the bus 214 to receive and provide access to data. In some embodiments, the data storage 243 may store data received from the other entities 101, 110, or 115 of the system 100, and provide data access to these entities. In some embodiments, the data storage 243 may be incorporated with the memory 237 or may be distinct therefrom. In some implementations, the data storage 243 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. The data stored in the data storage 243 is described below in more detail.

The capture device 245 may be operable to capture an image or data digitally of an object of interest. For example, the capture device 245 may be a high definition (HD) camera, a regular 2D camera, a multi-spectral camera, a structured light 3D camera, a time-of-flight 3D camera, a stereo camera, a standard smartphone camera, a wearable computing device, a barcode reader, etc. The capture device 245 is coupled to the bus to provide the images and other processed metadata to the processor 235, the memory 237, or the data storage 243. It should be noted that the capture device 245 is shown in FIG. 2A with dashed lines to indicate it is optional. For example, where the computing device 200 is the action platform server 110, the capture device 245 may not be part of the system, where the computing device 200 is the mobile computing device 115, the capture device 245 is included and is used to provide images and other metadata information described below.

The input/output (I/O) device(s) 247 may include any standard device for inputting or outputting information and may be coupled to the computing device 200 either directly or through intervening I/O controllers. Non-limiting example I/O devices 247 include a touch screen or any other similarly equipped display device equipped to display user interfaces, electronic images, and data as described herein, a touchpad, a scanner, a stylus, light emitting diode (LED) indicators, an audio reproduction device (e.g., speaker), a microphone, a barcode reader, an eye gaze tracker, a sip-and-puff device, and any other I/O components for facilitating communication and/or interaction with users. In different embodiments, the display can be binary (only two different values for pixels), monochrome (multiple shades of one color), or multiple colors and shades.

The sensor(s) 249 includes any type of sensors suitable for the computing device 200. The sensor(s) 249 are communicatively coupled to the bus 220. In the context of the mobile computing device 115, the sensor(s) 249 may be configured to collect any type of signal data suitable to determine characteristics of the mobile computing device 115 and/or its internal and external environments. Non-limiting examples of the sensor(s) 249 include various optical sensors (CCD, CMOS, 2D, 3D, light detection and ranging (LIDAR), cameras, etc.), audio sensors, motion detection sensors, magnetometer, barometers, altimeters, thermocouples, moisture sensors, infrared (IR) sensors, radar sensors, other photo sensors, gyroscopes, accelerometers, geo-location sensors, orientation sensor, wireless transceivers (e.g., cellular, WiFi™, near-field, etc.), sonar sensors, ultrasonic sensors, touch sensors, proximity sensors, distance sensors, microphones, etc. In some embodiments, one or more sensors 249 may include externally facing sensors provided at the front side, rear side, right side, and/or left side of the mobile computing device 115 in order to capture the situational context surrounding the mobile computing device 115. In some embodiments, the sensor(s) 249 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 249 can capture images of surrounding environments within their sensor range. For example, in the context of a mobile computing device 115, the image sensors 249 can capture the environment around the mobile computing device 115 including people, ambient light (e.g., day or night time), etc.

It should be understood that other processors, operating systems, sensors, displays, and physical configurations are possible.

As depicted in FIG. 2A, the memory 237 may include the operating system 107, and the action platform application 103.

The operating system 107, stored on memory 237 and configured to be executed by the processor 235, is a component of system software that manages hardware and software resources in the computing device 200. The operating system 107 includes a kernel that controls the execution of the action platform application 103 by managing input/output requests from the action platform application 103. The action platform application 103 requests a service from the kernel of the operating system 107 through system calls. In addition, the operating system 107 may provide scheduling, data management, memory management, communication control and other related services. For example, the operating system 107 is responsible for recognizing input from a touch screen, sending output to a display screen, tracking files on the data storage 243, and controlling peripheral devices (e.g., Bluetooth® headphones, earbuds, etc.). In one embodiment, the operating system 107 is a general-purpose operating system. For example, the operating system 107 may be Microsoft Windows®, Mac OS® or UNIX® based operating system. Or the operating system 107 may be a mobile operating system, such as Android®, iOS® or Tizen™. In another embodiment, the operating system 107 may be a special-purpose operating system. The operating system 107 may include other utility software or system software to configure and maintain the computing device 200.

The action platform application 103 includes an archiver 202, an action library curator 204, a processing engine 206, a context determiner 208, an action recommender 210, and a user interface 212. The components 202, 204, 206, 208, 210, and 212 of the action platform application 103 are coupled for communication with each other and the other components 235, 241, 243, 245, 247, and 249 of the computing device 200 by the bus 220. The components 202, 204, 206, 208, 210, and 212 of the action platform application 103 are also coupled to the network 105 via the communication unit 241 for communication with the other entities 101, 110, and 115 of the system 100.

In some embodiments, the components 202, 204, 206, 208, 210, and 212 of the action platform application 103 may each include software and/or logic to provide their respective functionality. In some embodiments, the components 202, 204, 206, 208, 210, and 212 of the action platform application 103 can each be implemented using programmable or specialized hardware including a field-programmable gate array (FPGA) or an application-specific integrated circuit (ASIC). In some embodiments, the components 202, 204, 206, 208, 210, and 212 of the action platform application 103 can each be implemented using a combination of hardware and software executable by the processor 235. In some embodiments, the components 202, 204, 206, 208, 210, and 212 of the action platform application 103 may each be stored in the memory 237 and be accessible and executable by the processor 235 to provide their respective acts and/or functionality. In any of these embodiments, the components of the action platform application 103 may each be adapted for cooperation and communication with the processor 235, the memory 237, and other components of the computing device 200 via the bus 220.

The archiver 202 may include software and/or logic to provide the functionality for determining and archiving interaction of users with one or more applications on the mobile computing device 115. In some embodiments, the archiver 202 determines a frequency of user accessing one or more applications in an application launcher of the mobile computing device 115. For example, the archiver 202 determines a number of times a user launched a messaging application in a day, week, month, etc. The archiver 202 determines a time during which the user accesses the one or more applications. For example, the archiver 202 determines that the user opens an email application in the morning between 8 AM and 10 AM. The archiver 202 determines a location where the user accesses the one or more applications. For example, the archiver 202 determines that the user launches a Wi-Fi home automation application when the user connects to a Wi-Fi spot at home. In another example, the archiver 202 determines that the user launches a calendaring application when the user is in the office. In yet another example, the archiver 202 determines that the user launches a web mapping service when the user is commuting. The archiver 202 determines a set of parameters of data and/or functions accessed within the one or more applications by the users. For example, the archiver 202 determines that a user launches a music streaming application and commonly plays a "Top 100 Billboard" playlist. In another example, the archiver 202 determines that the user launches the messaging application and commonly sends a text to a parent. In yet another example, the archiver 202 determines that the user opens the phone application and commonly calls a spouse. The archiver 202 determines interactions of the user with the applications in the application launcher. For example, the archiver 202 determines a selection of application icon, reordering of application icons in the application launcher, dismissal of notifications from applications, removing of application icons from the application launcher, grouping application icons in a folder, etc. The archiver 202 determines a user profile account of the user on the one or more applications. For example, the archiver 202 determines user preferences and settings based on accessing the user profile maintained by the online service 111 in the web server 101. The archiver 202 combines one or more of the above described determinations to archive new set of interaction data. For example, the archiver 202 determines that the user uses the phone application commonly to call a spouse when the user is commuting to home from the office. Example parameters of data archived by the archiver 202 from the user interaction with one or more applications include but not limited to frequently accessed phone contact, frequently accessed social network friend, frequently accessed email recipient, frequently accessed text message recipient, favorite playlist, recently accessed playlist, work address, home address, daily exercise routine, most commonly used payment method, etc. or any combination thereof in one or more applications. Example parameters of function archived by the archiver 202 from the user interaction with one or more applications include but not limited to streaming a playlist, checking traffic conditions, getting map directions, requesting a rideshare service, booking a restaurant table, making a phone call, sending a text message, sharing a photo, posting a status, performing a social check-in to a physical location, recording an exercise log, paying with rewards card, accessing car keys, etc. or any combination thereof in one or more applications. In some embodiments, the archiver 202 stores the interaction data of users with one or more applications in the archive data 222 of the data storage 243.

The action library curator 204 may include software and/or logic to provide the functionality for creating and managing an action library 224 in the data storage 243. The action library 224 includes a plurality of actionable items associated with the one or more applications on the mobile computing device 115. The action library curator 204 determines whether an API 109 is available for the one or more applications on the mobile computing device 115. For example, the action library curator 204 pings the online service 11 hosted by the web server 101 and uses the API 109 to identify the accessible application functionalities and/or data. The API 109 can be an internal or external API depending on the configuration of the online service 111 hosted by the web server 101. The action library curator 204 determines a function of the application accessible via the API 109. The action library curator 204 uses an API key to get access to the API 109 of the online service 111. For example, the API key may be available based on a subscription or partnership with the online service 111 and provides the action library curator 204 with a read access, write access, or both to the API 109 depending on the configuration of the API 109. The action library curator 204 uses the API 109 to parse an application and determine one or more constituent functions, tasks, or activities associated with the application available via the API 109. For example, an API 109 associated with an email online service 111 exposes a function to draft a new email. In another example, an API 109 associated with a social networking service 111 exposes a function to update a user's social media status. The action library curator 204 determines an API call to perform or initiate the function of the application via the API 109. The API call can be used to submit a request to the API 109 to perform a function of the application. The request includes the parameters or data associated with performing the function. The API 109 services the request of the API call and returns a response. The action library curator 204 generates an actionable item using the API call and one or more parameters associated with the application. The actionable item of an application may be a user interface element that links directly to an API call to automatically transmit a request to the API 109 of the online service 111 for performing a function, task or activity associated with the application. The actionable item performs the function of the application without requiring a launch of the associated application on the mobile computing device 115. In some embodiments, the actionable item may be a short cut to a specific function in the application. The action library curator 204 generates the actionable item using a uniform resource identifier (URI) of the function of the application. The actionable item uses the URI to provide a deep link that links to a specific location or page associated with the function of the application and initiates the function without any prompts, interstitial pages, or logins. For example, the action library curator 204 creates an actionable item "Email Rob" that can be invoked for initiating an email message to send to a contact named Rob without having to perform a sequence of steps including launching the associated email application in an application launcher, searching for the contact named Rob in the contact list, selecting the contact, and selecting the option to draft an email. In another example, the action library curator 204 creates an actionable item "Rock Playlist" that can be invoked for opening a song playlist of 'Rock' genre without having to perform a sequence of steps including launching the associated music streaming application, selecting a library in the start page, selecting a playlist option in the second page, browsing the listed playlists to select the "Rock Playlist" in the third page, and selecting the "Play" option in the fourth page of the music streaming application. In some embodiments, the action library curator 204 generates actionable items related to the system (e.g., system actions) of the application. The system actions include view application information, move application icon command, uninstall command, etc. The action library curator 204 classifies a category of the actionable item. For example, the action library curator 204 identifies actionable items for one or more social networking applications and groups the identified actionable items under a 'social' category. In some embodiments, the action library curator 204 parses the archive data 222 in the data storage 222, identifies the one or more applications and parameters associated with the interaction data, and builds the action library 224 based on the interaction data in the archive data 222 as described above.

The processing engine 206 may include software and/or logic to provide the functionality for processing information including one or more of the sensor data associated with the sensor(s) 249 and the interaction data of users with applications from the archiver 202. The sensor(s) 249 associated with the computing device 200 generate the sensor data. In some embodiments, the processing engine 206 receives the sensor data from the sensor(s) 249 and processes the sensor data. Example processed data includes, but not limited to, data describing a number of steps, data describing a geographic location (e.g., a latitude, a longitude and an elevation of a location) and velocity from a GPS sensor, data describing a presence of other devices in proximity to the mobile computing device 115, data describing a movement and a direction of movement from an accelerometer, data describing brightness in an environment from a light detector, data describing detecting ambient sounds from a microphone, data describing detecting wireless access points from a wireless transceiver, etc. Other example processed data is possible. In some embodiments, the processing engine 206 receives user interaction data including but not limited to installed applications on the mobile computing device 115, user interaction data with applications (e.g., playing music, composing email message, posting a photo to social network, etc.), application usage history data, application notification data, communication and call history data, etc. from the archiver 202 Other example user interaction data is possible. The processing engine 206 receives the sensor data and user interaction data with permission from the user. In some embodiments, the processing engine 206 combines the sensor data and user interaction data into one signal stream for joint processing. The processing engine 206 filters the sensor data and/or the user interaction data (e.g., signal stream) to determine an event. An event may be an action or occurrence relating to an application on a user interface of the mobile computing device 115. For example, the processing engine 206 may determine a graphical user interface (GUI) event. A source of GUI events includes the user, who may interact with the applications in an application launcher by way of, for example, button presses, swipes, a prolonged selection of an application icon (e.g., long-press), a selection of a notification related to an application, a gesture, etc. An event may also be a change in an environment of the mobile computing device 115. For example, the processing unit 206 may determine a change in location coordinates and time and outputs a filtered signal data including geo-location of the mobile computing device 115.

The context determiner 208 may include software and/or logic to provide the functionality for receiving the processed data from the processing engine 206 and determining a context in the processed data. The context determiner 208 analyzes the processed data and determines a context associated with the processed data. In some embodiments, the context determiner 208 uses the processed data as input to activity recognition algorithms to determine a contextual user activity. For example, the context determiner 208 determines a user activity such as, running, walking, commuting, etc. based on analyzing the processed data. In some embodiments, the context determiner 208 determines whether the context is ongoing and persisting for a threshold period of time. If the context is determined to persist, the context determiner 208 sends an indication of the context to the action recommender 210. For example, if the context determiner 208 determines a context of the user of the mobile computing device 115 is that the user is starting a run and the context determiner 208 detects the running activity is continuous for a threshold period of 30 seconds, then the context determiner 208 sends an indication of the context of running to the action recommender 210. The context determiner 208 combines different types of data in the processed data to determine a context in terms of human understandable actions. For example, the context determiner 208 combines one or more of the following data including: (1) a change in geo-location data from the GPS sensor, (2) proximity detection data indicating presence of an automobile (e.g., Bluetooth enabled), and (3) a scheduled business event in a calendaring application to determine that the user is commuting in a car to a business meeting. In another example, the context determiner 208 combines one or more of the following data including: (1) a time, (2) geo-location data from a GPS sensor, and (3) a detection of an open Wi-Fi access point to determine that the user is inside a coffeehouse. In a third example, the context determiner 208 combines one or more of the following data including: (1) motion data from an accelerometer, (2) ambient illumination data from a light sensor, (3) geo-location data, and (4) energy usage data from a power detector on the mobile computing device 115 to determine that the user is running. The context determiner 208 sends information including the determined context to the action recommender 210.

The action recommender 210 may include software and/or logic to provide the functionality for receiving the context from the context determiner 208 and surfacing one or more actionable items from the action library 224 based on the context. For example, the actionable items are surfaced in the user experience of the mobile computing device 115.

Figure 2B:
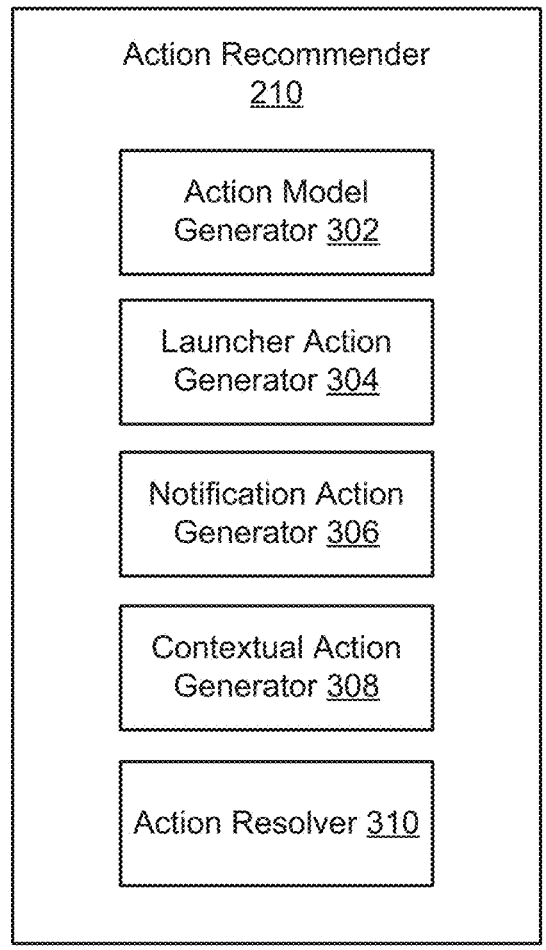
FIG. 2B is a block diagram illustrating an example embodiment of an action recommender.

FIG. 2B is a block diagram illustrating an example embodiment of an action recommender 210. As depicted, the action recommender 210 may include an action model generator 302, a launcher action generator 304, a notification action generator 306, a contextual action generator 308, and an action resolver 310.

The action model generator 302 receives a training dataset including classified, labeled features suitable for training a machine learning model. The training dataset may correspond to a particular demographic group to which the user of the mobile computing device 115 belongs. The training dataset includes context signals as features and an actionable item as the label. The action model generator 302 generates one or more action models based on the training dataset. The action model generator 302 stores the action model(s) 226 in the data storage 243. The action model generator 302 may include a machine learning logic to train the one or more action models. In some embodiments, the action model generator 302 may use one or more machine learning models to create and train the one or more action models on the training data. Depending on the embodiment, the one or more machine learning models used may include supervised machine learning models only, unsupervised machine learning models only, or both supervised and unsupervised machine learning models. Example machine learning models include but are not limited to a classification model, a regression model, a ranking model, a semi-supervised model, a density estimation model, a clustering model, a dimensionality reduction model, a multidimensional querying model, an ensemble model, convolutional neural network, etc. The action model generator 302 provides the trained action models to the launcher action generator 304, the notification action generator 306, and the contextual action generator 308. The trained action models provided to the components 304, 306, and 308 may be the same or different models. In some embodiments, the components 304, 306, and 308 may use the one or more action models to surface actionable items from the action library 224. The action model may receive as input the contextual state of the mobile computing device 115 and generate a list of actionable items as described herein. The action model generator 302 retrieves interaction data of user from the archive data 222 and updates the training dataset. The action model generator 302 retrains the action model(s) 226 in the data storage 243 using the updated training dataset. Other system architectures for implementing machine learning logic with various types of supervised learning algorithm and/or unsupervised learning algorithm are also possible and contemplated.

The launcher action generator 304 determines the context is associated with an application launcher of the mobile computing device 115 and surfaces one or more actionable items from the action library 224 in response to the context. For example, the launcher action generator 304 determines the context is one of accessing actions associated with a select application by long-pressing the select application in the application launcher. The launcher action generator 304 generates an action menu including one or more actionable items related to the application. The actionable items related to one or more applications can be defined as tailored actionable items. For example, the tailored actionable items related to an application are quick actionable items making accessible to the user the most commonly accessed data and/or functions of the application. The launcher action generator 304 populates the action menu with the actionable items of the application and ranks the actionable items in the action menu based on a ranking scheme. For example, the actionable items related to the application in the action menu may be ranked such that the most commonly accessed data and/or functions of the application are at the top of the action menu. In some embodiments, the launcher action generator 304 cross-pollinates the action menu with actionable items of another application. For example, the launcher action generator 304 determines a category of a first application for which action menu is being generated. The launcher action generator 304 uses the category to search the action library 224 for actionable items. The launcher action generator 304 identifies actionable items of a second application that belongs to the same category as the first application. The launcher action generator 304 generates the action menu including the actionable items of the first and the second application.

The notification action generator 306 determines a context is associated with a notification of an application and surfaces one or more actionable items from the action library 224 in response to the context. For example, the notification action generator 306 determines the context is opening a notification of an application by swiping down the notification in the notification bar for a detailed view. The notification action generator 306 generates an action menu including actionable items of applications related to the context of the notification. For example, a notification from a music streaming application may indicate a new album by an artist is now available for purchase. The notification action generator 306 generates an action menu with a first actionable item to add the track to a playlist on the music streaming application, a second actionable item to buy the album on an online digital media store application, and a third actionable item to find tickets to a concert of the artist on an online ticket exchange service application. The first, second and third actionable items are tailored actionable items surfaced in the action menu to facilitate the user to take an action in relation to the notification about the new album.

The contextual action generator 308 determines the context is associated with an ambient environmental conditions of the mobile computing device 115 and surfaces one or more actionable items from the action library 224 in response to the context. For example, the contextual action generator 308 determines the context is associated with a fitness activity and generates an action menu or contextual experience menu that includes one or more actionable items related to fitness surfaced from the action library 224. The example actionable items may prompt the user to record the fitness activity with a fitness application, start playing a workout playlist on a music streaming application, etc. As such, the actionable items are tailored because they match the context of the fitness activity. In another example, the contextual action generator 308 determines the context of the mobile computing device 115 getting connected to home Wi-Fi network is indicative of the user getting into the house. The contextual action generator 308 generates an action menu including one or more actionable items related to the home context where the actionable items prompt the user to turn on lights, play music on a smart speaker, adjust thermostat, etc. In some embodiments, the contextual action generator 308 determines the context is associated with receiving a gesture input from the user and surfaces contextual actions including one or more actionable items from the action library to satisfy the gesture input. For example, the gesture input can be a stroke of a letter on a gesture pad of the mobile computing device 115. The contextual action generator 308 searches for actionable items relating to the letter from the action library and populates an action menu with the actionable items. Examples of gesture input include but not limited to letters, numbers, emoticons, doodles, etc.

The action resolver 310 receives a user selection of an actionable item in an action menu and uses the API 109 of the online service 111 hosted by the web server 101 to perform the action of an application associated with the actionable item without launching the application on the mobile computing device 115. The action resolver 310 invokes the API call associated with the actionable item when the actionable item is selected in the user interface. The API call passes the parameters of the actionable item to the API 109 to execute the function of the application. In some embodiments, the action resolver 310 generates a secondary action screen in response to receiving the user selection of the actionable item. The actionable item may need a multi-step action. The secondary action screen is generated as a HTML5 client to receive additional user input to complete the action of the application associated with the actionable item. For example, an actionable item to send a text message to Alice needs two user inputs to complete the action: one to select the actionable item in the action menu and the second to enter the message in a secondary action screen. The action resolver 310 transmits the text message entered in the secondary action screen to the API 109 of the text messaging application using the API call and the text message is sent to Alice without the user needing to launch the text messaging application.

Referring back to FIG. 2A, the user interface engine 212 may include software and/or logic to provide the functionality for generating and transmitting user interfaces to the display of the mobile computing device 115. In some embodiments, the user interface engine 212 receives instructions from the action recommender 210 to generate a user interface presenting an action menu including one or more actionable items. The user interface engine 212 sends instructions including graphical user interface data to the mobile computing device 115 via the communication unit 241 causing the mobile computing device 115 to display the data as a graphical user interface.

Figure 3:
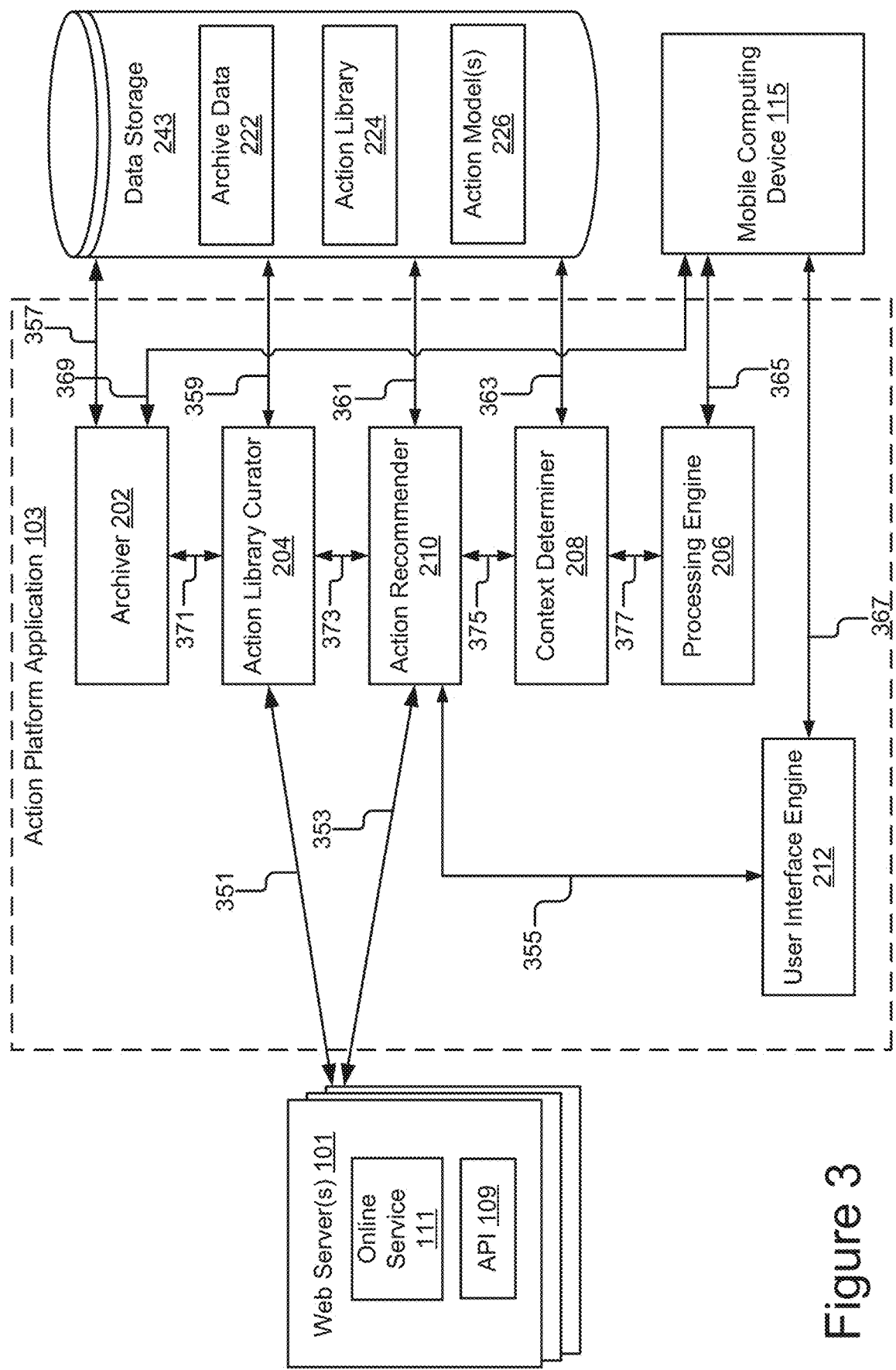
FIG. 3 is a block diagram illustrating another example embodiment of the action platform application.

Referring now to FIG. 3, another example implementation of the action platform application 103 is shown. FIG. 3 shown the general data flow through the action platform application 103 to surface the actionable items of one or more applications in the user experience of the mobile computing device 115. FIG. 3 illustrates how components of the action platform application 103 communicate with each other and the web servers 101. In particular, the action library curator 204 and the action recommender 210 cooperate with the APIs 109 of the online services 111 hosted by multiple web servers 101 via the signal lines 351 and 353 respectively. The API 109 exposes the functionality and data of the online service 111 to the action platform application 103 for the action library curator 204 to create the action library 224 and for the action recommender 210 to pass parameters of the invoked actionable items to the API 109 to perform a function of an associated application. The action recommender 210 surfaces the actions from the action library 224 for initiating the actions of the applications without launching the applications on the mobile computing device 115.

The archiver 202 archives how the user of the mobile computing device 115 interacts with the applications accessible on the mobile computing device 115 and creates a profile of the user based on the interaction data. The archiver 202 may be coupled to the mobile computing device 115 via signal line 369 to receive the interaction data from the mobile computing device 115. The archiver 202 identifies and groups the applications associated with the mobile computing device 115 under one or more categories. For example, the archiver 202 groups the applications, such as text messaging, email applications, chat applications, etc. under 'Communication' category. The archiver 202 archives how the data or result of one application is used to interact with another application by the user. For example, when a notification from a calendaring application includes a reminder about a scheduled event 30 minutes in the future, the calendaring application often does not receive any further action from the user. However, the reminder would cause the user to launch a web mapping application to determine directions to the event location or traffic conditions, booking a car via the ride sharing application, or initiating a phone call to the event host. In some embodiments, once such interaction data is determined, the archiver 202 transmits the data to the data storage 243 for storing in the archive data 222. The archiver 202 may be coupled to the data storage 243 via signal line 357. The archiver 202 also transmits the interaction data to the action library curator 204. The archiver 202 may be coupled to the action library curator 204 via signal line 371.

Turning now to the action library curator 204, the action library curator 204 receives the interaction data from the archiver 202. The action library curator 204 parses the interaction data, generates a library of actionable items and provides them to the action recommender 210 via the signal line 373 as has been described above. The action library curator 204 also transmits the library for storing in the action library 224 of the data storage 243. The action library curator 204 may be coupled to the data storage 243 via signal line 359. Examples of action library categories include but not limited to music action library (e.g., play 'Workout Mix,' Launch 'Radio X City,' stream 'Background Noise,' etc.), auto action library (e.g., start engine, open trunk, unlock car, etc.), productivity action library (e.g., create event, set reminder, set alarm, etc.), fitness action library (e.g., record run, record gym routine, etc.), Internet of Things (IOT) action library (e.g., switch lights, set thermostat, lock door, etc.), social action library (e.g., post a status, share a photo, etc.), communication action library (e.g., text Mom, email Bob, etc.), and payment action library (e.g., pay with card, redeem rewards, etc.).

The processing engine 206 receives the sensor data associated with the sensors from the mobile computing device 115 via the signal line 365, processes the sensor data, filters the sensor data and sends the filtered data to the context determiner 208 via the signal line 377. The context determiner 208 receives the filtered data from the processing engine 206, combines different types of data in the filtered data, determines a context using one or more activity recognition algorithms, and sends the context determination to the action recommender 210 via the signal line 375. The context determiner 208 is coupled to the data storage 243 via the signal line 363.

Turning now to the action recommender 210, the action recommender 210 receives information including the action library from the action library curator 204 and the context from the context determiner 208. In some embodiments, the action recommender 210 creates action models for turning predictions which can be used to surface the actionable items from the action library 224. The action recommender 210 stores the action models in the data storage 243. The action recommender 210 may be coupled to the data storage 243 via signal line 361. The action recommender 210 sends instructions to the user interface engine 212 to display the actionable items in the user interface of the mobile computing device 115 via the signal line 355. The user interface engine 212 receives user selection of an actionable item from the mobile computing device 115 via the signal line 367 and transmits the selection to the action recommender 210. The action recommender 210 cooperates with the API 109 to perform the function associated with the actionable item.

Figure 4:
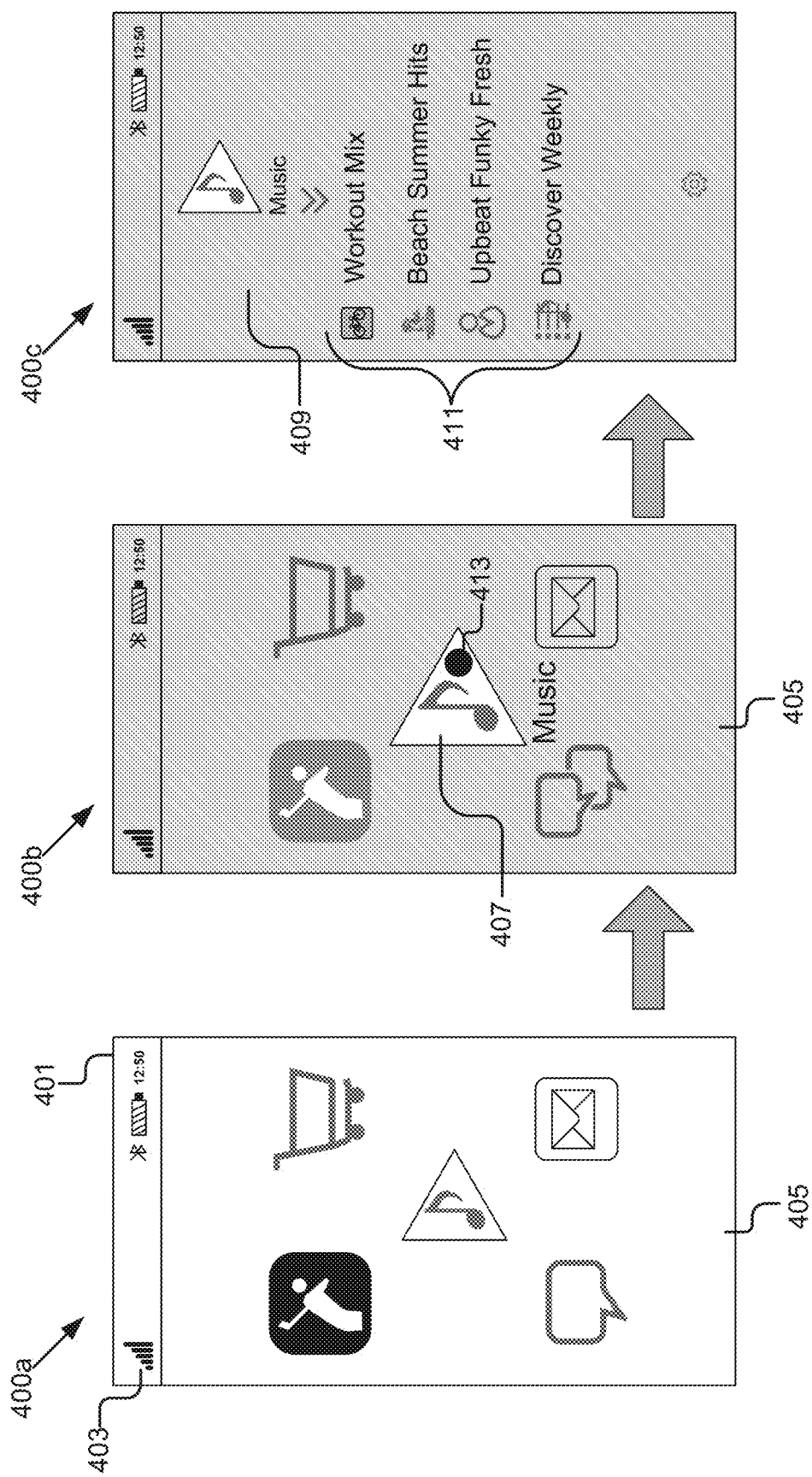
FIG. 4 shows example graphical representations illustrating user interfaces for surfacing actionable items relating to an application in the application launcher.

As shown in the example of FIG. 4, the graphical representations illustrate user interfaces 400a-400c for surfacing actionable items relating to an application in the application launcher. The user interface 400a of a mobile computing device 401 includes two components: a system bar 403 and an application launcher 405. The system bar 403 depicts icons and/or graphics relating to clock, cell service, battery power, antenna signals, etc. that persists on the display. The application launcher 405 depicts a set of icons of applications stacked vertically. The user may scroll the application launcher 405 up and down to view more icons. The user interface 400b depicts a prolonged user selection of the music application icon 407 in the application launcher 405. For example, the prolonged user selection can be a long-press gesture where the icon 407 is touched and pressed for a few seconds by the user without sliding a finger. The black solid circle 413 is representative of the gesture of prolonged user selection with respect to the icon 407. The user interface 400c depicts an action menu 409. In response to receiving the long-press gesture, the action recommender 210 generates the action menu 409 relating to music application 407. The action menu 409 includes a list 411 of actionable items associated with the music application 407 retrieved from the action library 224 in the data storage 243. The list 411 of actionable items is tailored to surface the most commonly accessed content items and/or recently accessed content items in the action menu of the music application 407. In the context of the music application 407, the action menu 409 provides deep links to a limited list 411 of functions that can be initiated without launching the music application 407. In some embodiments, the action menu 409 can be generated as a translucent overlay over the application launcher 405 blurring the application icons in the background. In some embodiments, the action recommender 210 receives information including a contextual state during which the long-press gesture of the application is received. The action recommender 210 uses the contextual state to surface tailored actionable items in the action menu of the application. For example, the action recommender 210 determines a context of the user is indicative of the user being home. In response to the user uses applying a long-press gesture on the music application 407, the action recommender 210 determines a tailored list of actionable items that include playlist selections that are relaxing as opposed to high energy playlist selections for a fitness activity.

Figure 5:
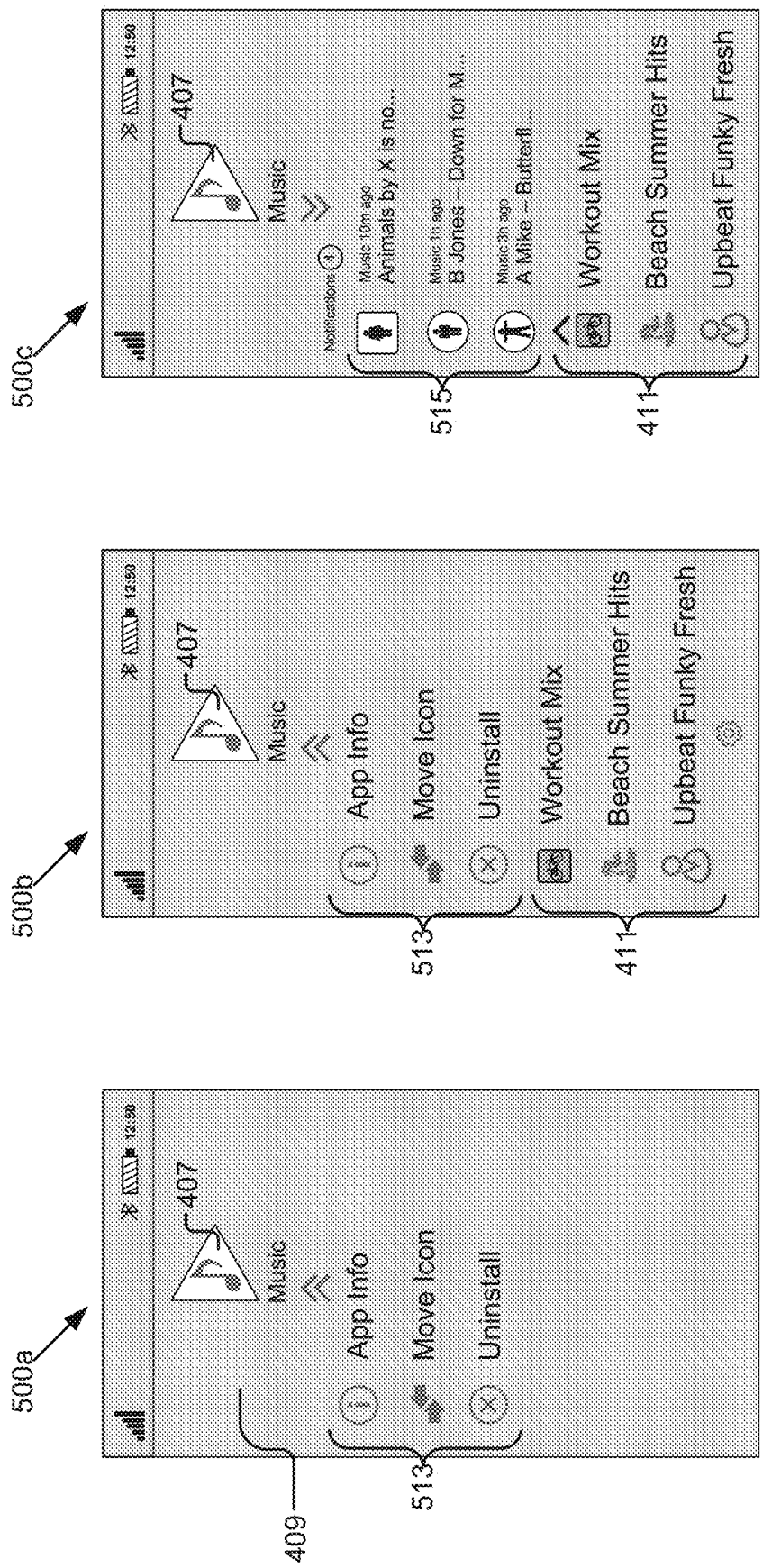
FIG. 5 shows example graphical representations illustrating embodiments of user interfaces for depicting an action menu relating to an application.

FIG. 5 shows example graphical representations illustrating embodiments of user interfaces 500a-500c depicting an action menu relating to an application. The user interface 500a depicts a first embodiment of an action menu 409 that includes a list 513 of system actions related to the music application 407. If there are no actionable items available for an application, in some embodiments, the action recommender 210 generates the action menu 409 with the list 513 of system actions of the music application 407 expanded in a default state. The list 513 of system actions include application information, move icon command, and an uninstall command. The system action is also a form of actionable item that can be invoked to perform the associated function. The user interface 500b depicts a second embodiment of an action menu 409 that includes a combination of lists 411 and 513 related to the music application 407. The user interface 500c depicts a third embodiment of an action menu 409 that includes a list 515 of unread notifications relating to the music application 407 in addition to the list 411 of actionable items. In some embodiments, the action recommender 210 identifies the unread notifications as important set of actions and places the unread notifications at the top of the action menu 409. The list 515 of unread notifications visually indicates a count of the unread notifications. The unread notifications can be expanded for a full view without needing to launch the music application 407. When the notifications in the list 515 is dismissed from the action menu 409, it is also dismissed from the notification bar and vice versa.

Figure 6:
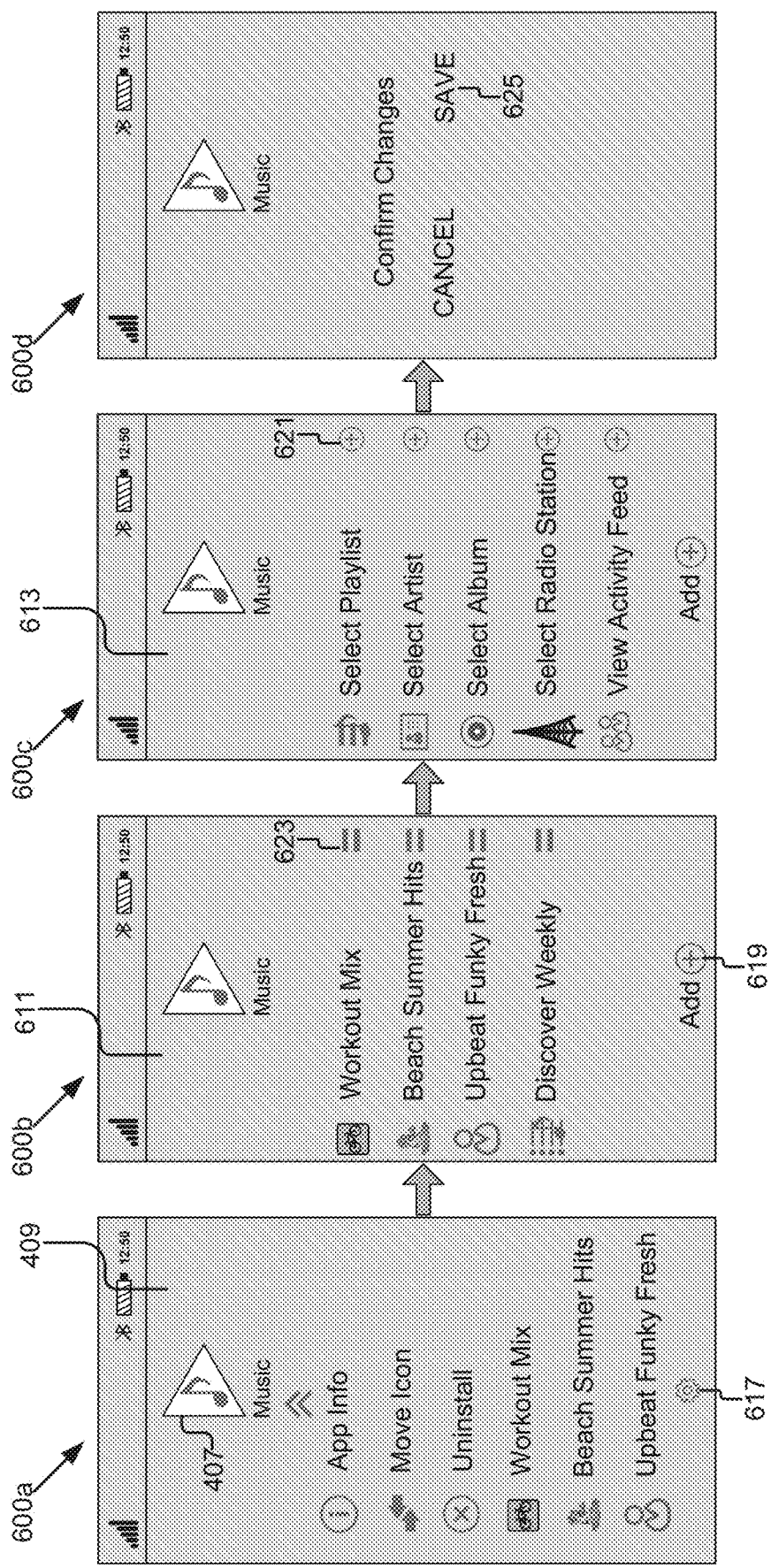
FIG. 6 shows example graphical representations illustrating user interfaces for editing the actions in the action menu.

FIG. 6 shows example graphical representations illustrating user interfaces 600a-600d for editing the actions in the action menu. The user interface 600a depicts an action menu 409 that includes an edit button 617 for adding or removing the actionable items related to the music application 407. The user interface 600b depicts an action menu 611 that is updated in response to the user selection of the edit button 617 in the user interface 600a. The action menu 611 includes a remove button 623 for each actionable item and an add button 619 to add actionable items. The user interface 600c depicts an action menu 613 that is updated in response to the user selection of the add button 619 in the user interface 600b. The action menu 613 includes a set of actionable items and the user may add an actionable item by selecting the add button 621 next to each actionable item. The user interface 600*d* depicts a screen to confirm changes to the action menu. The user can select save button 625 to save the changes.

Figure 7:
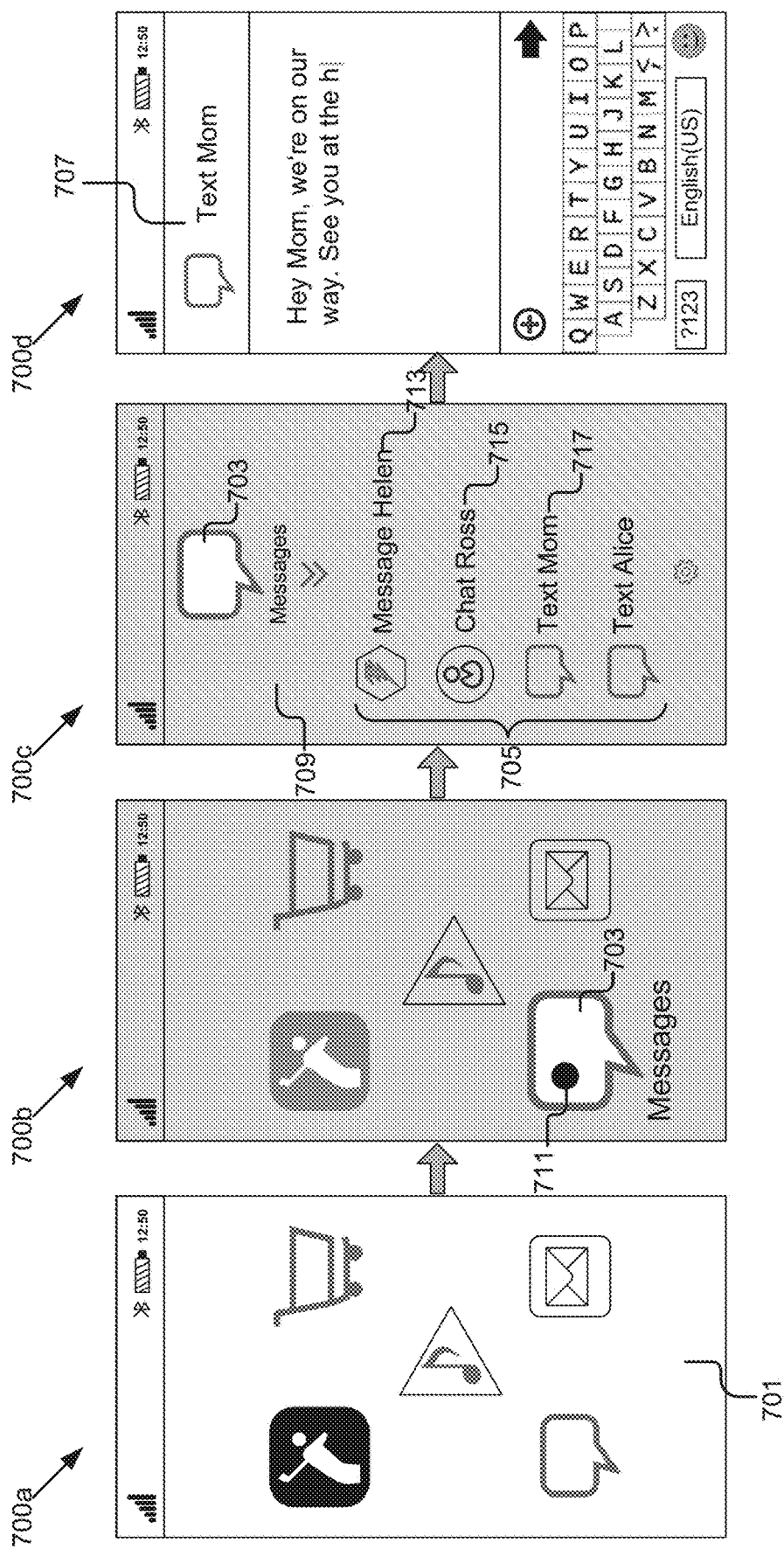
FIG. 7 shows example graphical representations illustrating user interfaces for surfacing actionable items relating to a second application in the action menu of a first application.

In some embodiments, the action recommender 210 surfaces actionable items relating to a second application in the action menu of a first application. As shown in the example of FIG. 7, the example graphical representation illustrates user interfaces 700*a*-700*d* for surfacing actionable items relating to a second application in the action menu of a first application. The user interface 700*a* depicts an application launcher 701 including a set of application icons. The user interface 700*b* depicts a prolonged user selection of the messaging application icon 703. The black solid circle 711 is representative of the gesture of prolonged user selection with respect to the icon 703. The user interface 700*c* depicts an action menu 709 relating to the messaging application 703. In response to receiving the gesture, the action recommender 210 generates the action menu 709 relating to messaging application 703. The action menu 709 includes a cross-pollinated list 705 of actionable items from other applications in addition to the actionable items from the messaging application 703. For example, the actionable items 713 and 715 belong to the other applications in the communication category. The user interface element of each actionable item includes an associated application icon. The user interface 700*d* depicts a secondary action screen 707 to complete the action selected in the user interface 700*c*. In response to the user selecting the actionable item 717 in the user interface 700*c*, the action recommender 210 generates the secondary action screen 707 where the user may enter the message to send to the selected contact without launching the messaging application 703.

Figure 8:
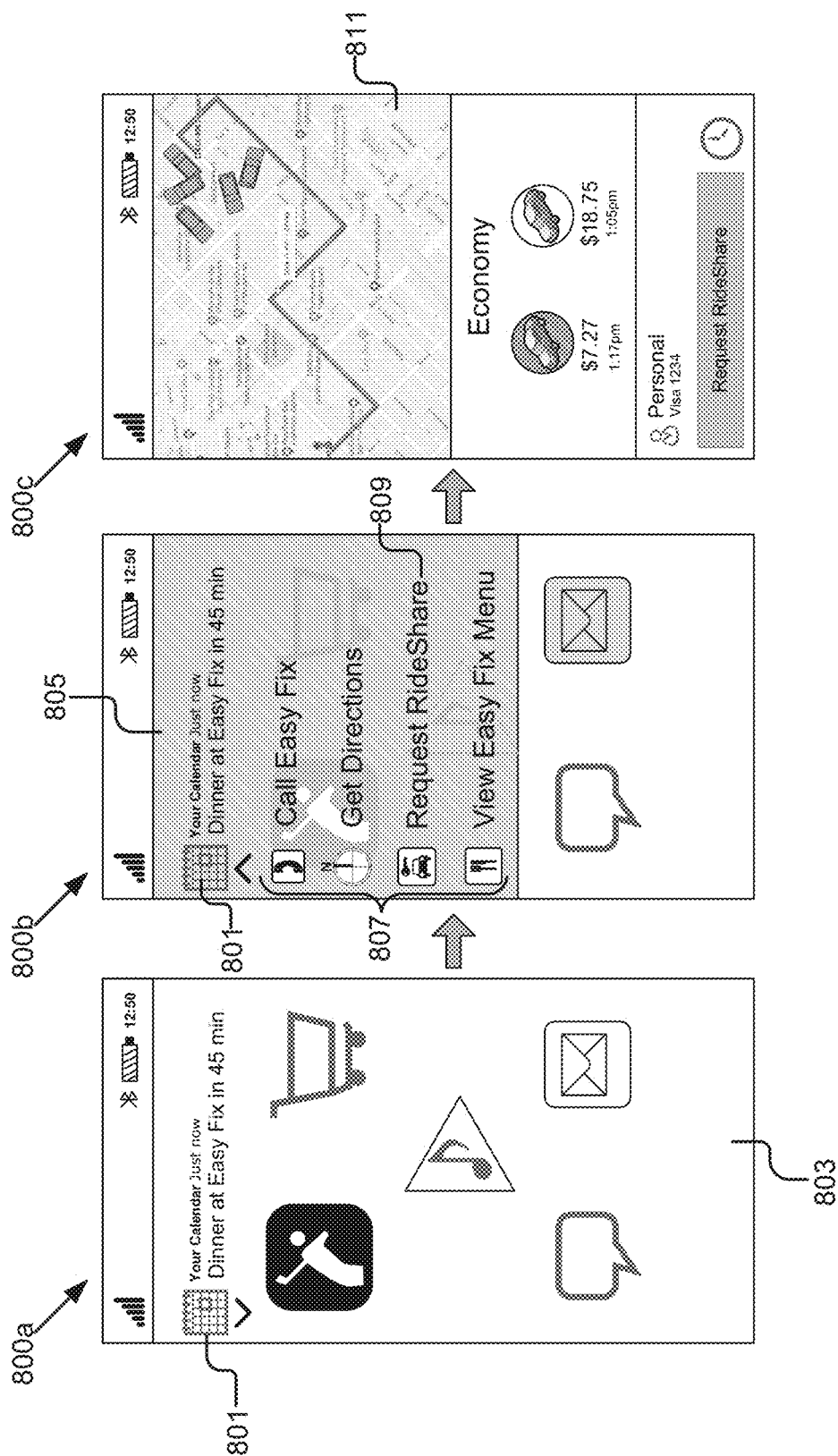
FIG. 8 shows example graphical representations illustrating user interfaces for surfacing actionable items relating to the notification of an application in the user interface.

In some embodiments, the action recommender 210 surfaces actionable items from the action library 224 relating to a notification of an application. As shown in the example of FIG. 8, the graphical representation illustrates user interfaces 800*a*-800*c* for surfacing actionable items relating to the notification of an application in the user interface. The user interface 800*a* depicts an incoming notification 801 from a calendaring application in the application launcher 803. The user interface 800*b* depicts an action menu 805 relating to the notification 801. The action menu 805 includes a list 807 of actionable items. In response to the user selecting the notification 801 in the user interface 800*a*, the action recommender 210 generates the action menu 805 relating to the notification 801 of the calendaring application and presents the action menu 805 as a drop down overlay on top of the application launcher 803. The user interface 800*c* depicts a secondary action screen 811 to complete the action selected in the user interface 800*b*. In response to the user selecting the actionable item 809 in the action menu 805 in the user interface 800*b*, the action recommender 210 generates the secondary action screen 811 where the user may request a rideshare car service without launching the ridesharing application.

Figure 9:
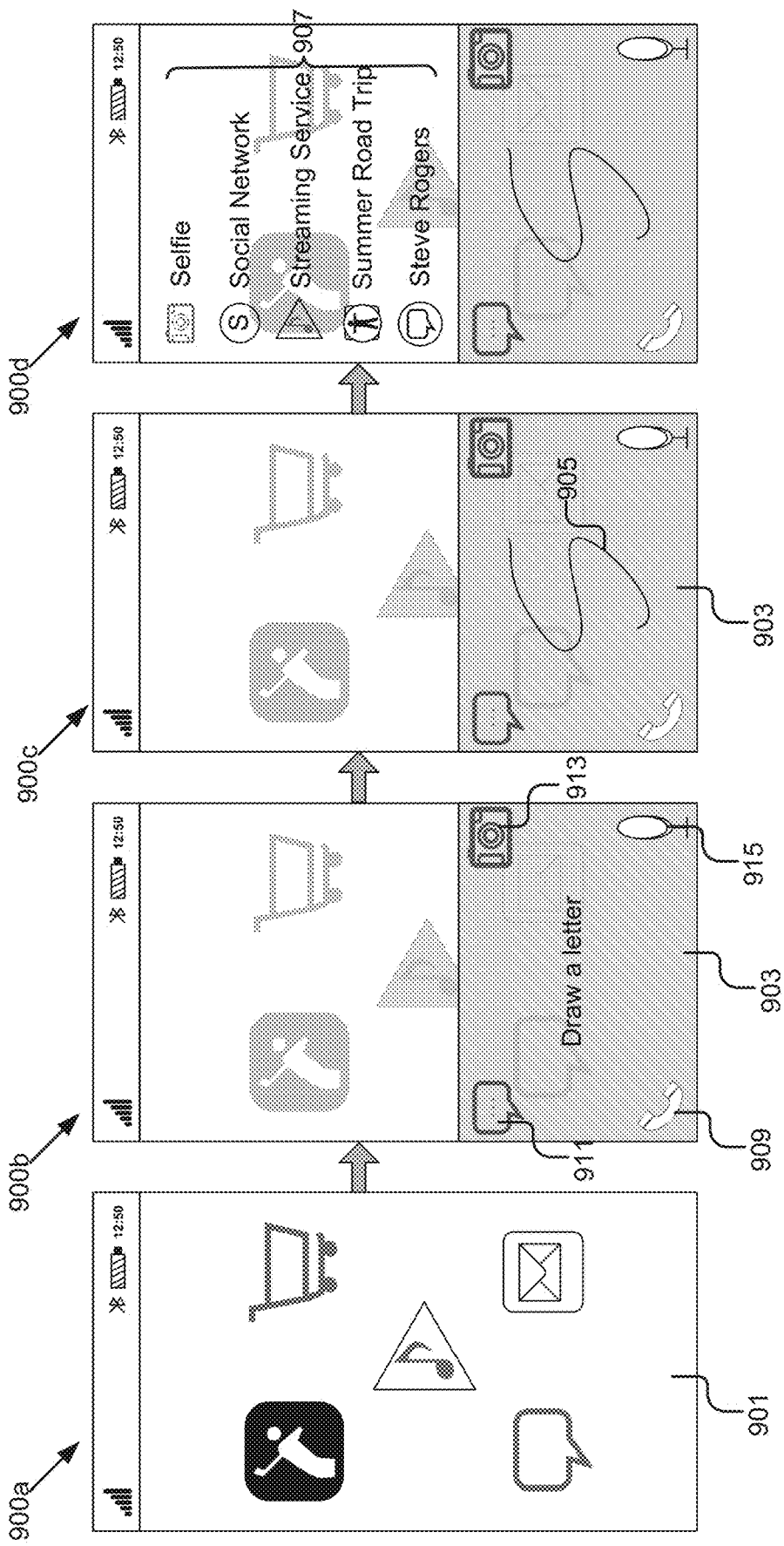
FIG. 9 shows example graphical representations illustrating user interfaces for surfacing actionable items in response to a gesture input.

In some embodiments, the action recommender 210 surfaces actionable items from the action library 224 in response to a gesture input. As shown in the example of FIG. 9, the graphical representations illustrate user interfaces 900*a*-900*d* for surfacing actionable items in response to a gesture input. The user interface 900*a* depicts the application launcher 901 including a set of application icons. The user interface 900*b* depicts a gesture pad 903 brought into view in response to the user swiping up the display from the bottom of the user interface 900*a*. In some embodiments, the gesture pad 903 may be brought into view from a lock screen. The gesture pad 903 includes four application icons 909, 911, 913 and 915. The action menu relating to these four applications can be surfaced from the gesture pad 903 by the user, if needed. The user interface 900*c* depicts a stroke input 905 of a letter 'S' on the gesture pad 903 by the user. The action recommender 210 surfaces actionable items contextual to the stroke input 905. For example, as shown in the user interface 900*d*, the action recommender 210 generates a list 907 of actionable items relating to the letter 'S'. The actionable items may include a shortcut to applications starting with the letter 'S'.

Figure 10:
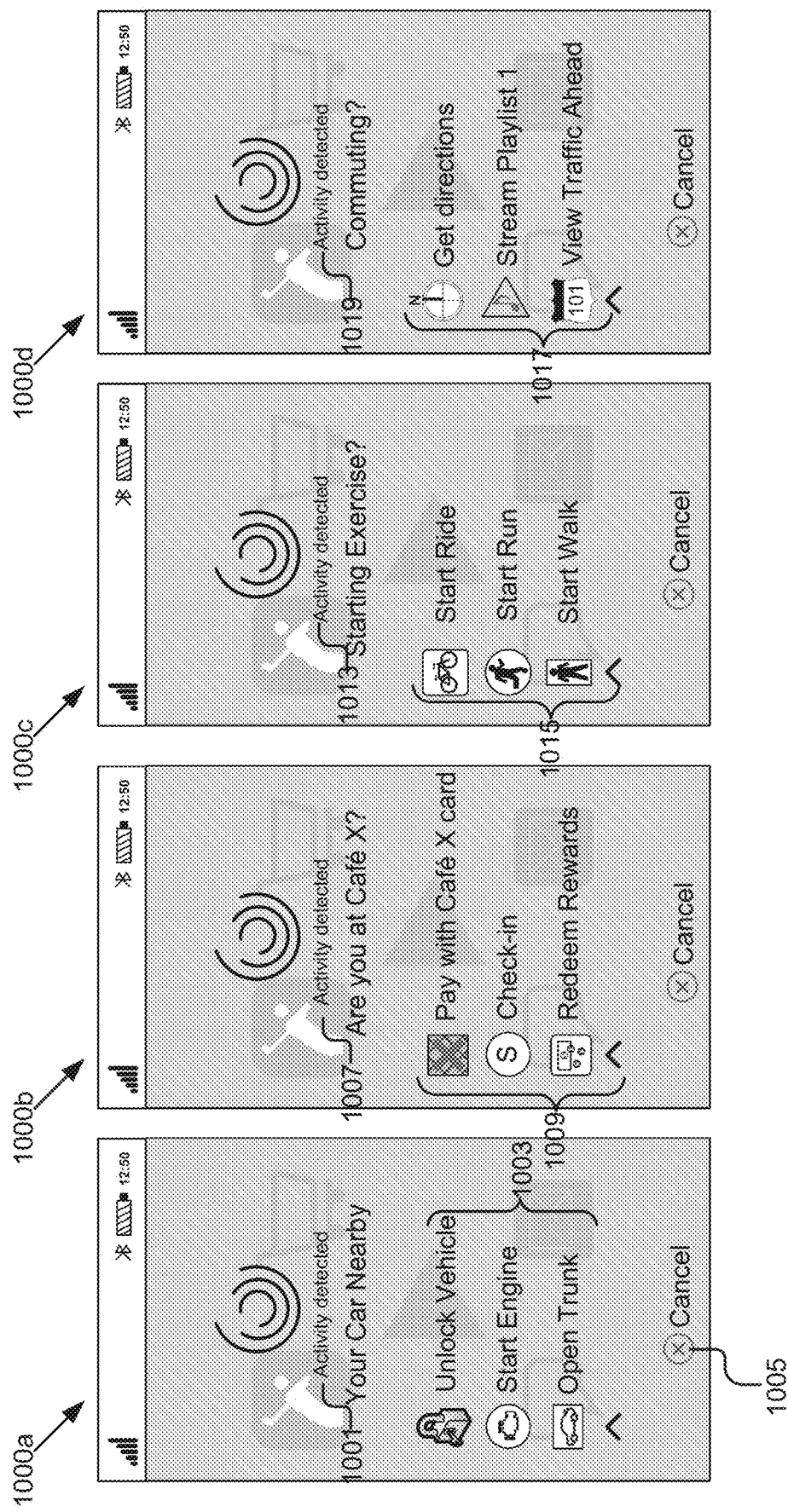
FIG. 10 shows example graphical representations illustrating user interfaces for surfacing actionable items in response to a contextual activity.

In some embodiments, the action recommender 210 surfaces actionable items from the action library 224 in response to a contextual trigger of an activity detected by the context determiner 208. As shown in the example of FIG. 10, the graphical representations illustrate user interfaces 1000*a*-1000*d* for surfacing actionable items in response to a contextual activity. The user interface 1000*a* depicts a first embodiment in which a car of a user is detected in proximity of the mobile computing device 115. The user interface 1000*a* depicts a notification 1001 of the car detected nearby. The notification 1000*a* is an overlay over the application launcher window. The user interface 1000*a* includes a list 1003 of actionable items that is contextually related to the car detected in proximity. For example, the user may select the actionable items in the list 1003 to unlock the car, start the engine and/or open the trunk. These actionable items may be associated with a vehicle application enabling the mobile computing device 115 to remotely control the car. The remote control functions included in the list 1003 are performed without the user having to launch the vehicle application. The user may remove the notification by selecting the cancel button 1005. The user interface 1000*b* depicts a second embodiment in which the user location inside a coffeehouse is detected. The user interface 1000*b* depicts a notification 1007 inquiring if the user is in the coffeehouse and includes a list 1009 of actionable items contextually related to the user detected in the coffeehouse. For example, the user may select the actionable items in the list 1009 to pay for coffee with a card, check in on the social network, and/or redeem rewards using loyalty points. The user interface 1000*c* depicts a third embodiment in which user engaging in a fitness activity is detected. The user interface 1000*c* depicts a notification 1013 inquiring if the user is starting an exercise and includes a list 1015 of actionable items relating to the context of the fitness activity. For example, the user may select the actionable items in the list 1015 to start recording the cycling activity, start recording a run or start recording a walk. The user interface 1000*d* depicts a fourth embodiment in which user is detected to be commuting. The user interface 1000*d* depicts a notification 1019 inquiring if the user is commuting and includes a list 1017 of actionable items relating to the context of commuting. For example, the user may select the actionable items in the list 1017 to get directions to the destination, stream a playlist while commuting and/or view the traffic conditions.

Figure 11A:
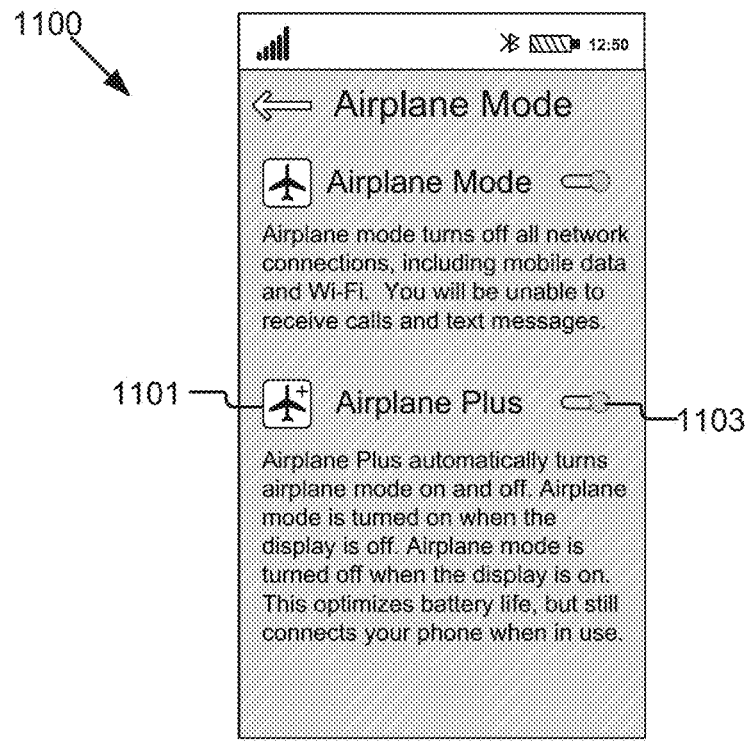
FIG. 11A-11B show example graphical representations of embodiments of the user interface for customizing settings on the mobile computing device.
Figure 11B:
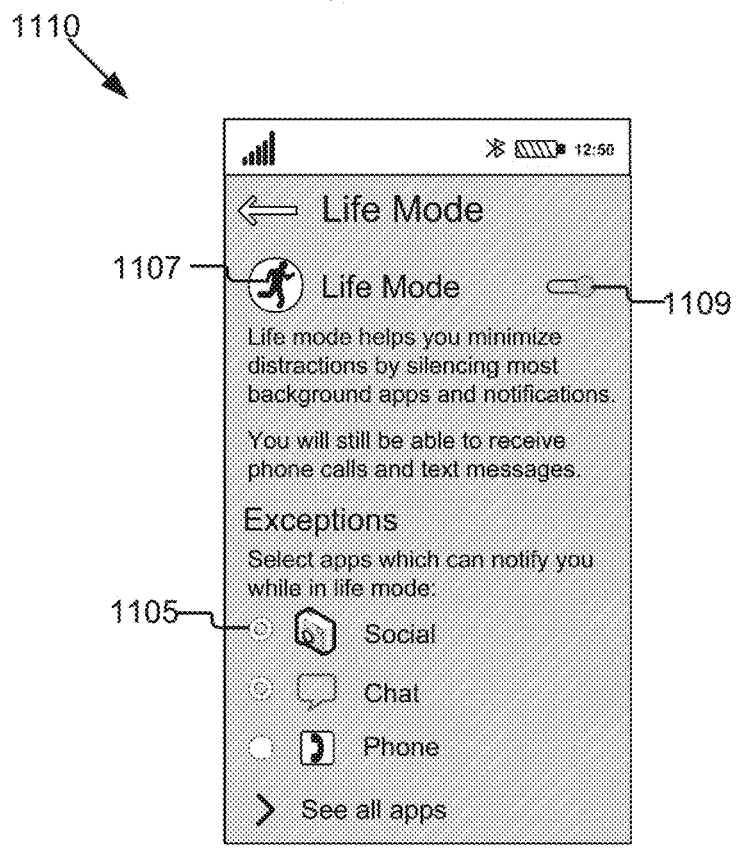

FIGS. 11A-11B are example graphical representations of embodiments of the user interface for customizing settings on the mobile computing device 115. In FIG. 11A, the graphical representation illustrates an embodiment of a user interface 1100 for toggling an improved form of airplane mode. The user interface 1100 includes an Airplane Plus mode 1101 that suspends radio-frequency signal transmission including but not limited to telephony, Bluetooth, Wi-Fi, GPS, etc. when the mobile computing device 115 is switched to a sleep or standby mode. For example, the mobile computing device 115 is put to sleep when the sleep/wake physical button that turns a display of the mobile computing device 115 on and off is pressed. The radio-frequency signal transmission is activated when the mobile computing device 115 is woken up. The Airplane Plus mode 1101 includes exceptions for applications that are currently running on the mobile computing device 115. For example, a phone call in progress is not disrupted when the mobile computing device 115 goes to standby mode after a few minutes into the phone call. Likewise, a navigation via web mapping application is not disrupted in a similar example. The Airplane Plus mode 1101 is toggled using the button 1103. In FIG. 11B, the graphical representation illustrates an embodiment of a user interface 1110 for toggling an improved form of Do Not Disturb mode. The user interface 1110 includes a Life Mode 1107 that limits interruptions from background applications and notifications on the mobile computing device 115. The user interface 1110 includes a section for selecting exceptions where the user may select which applications 1105 can notify the user while in Life Mode 1107.

Figure 12:
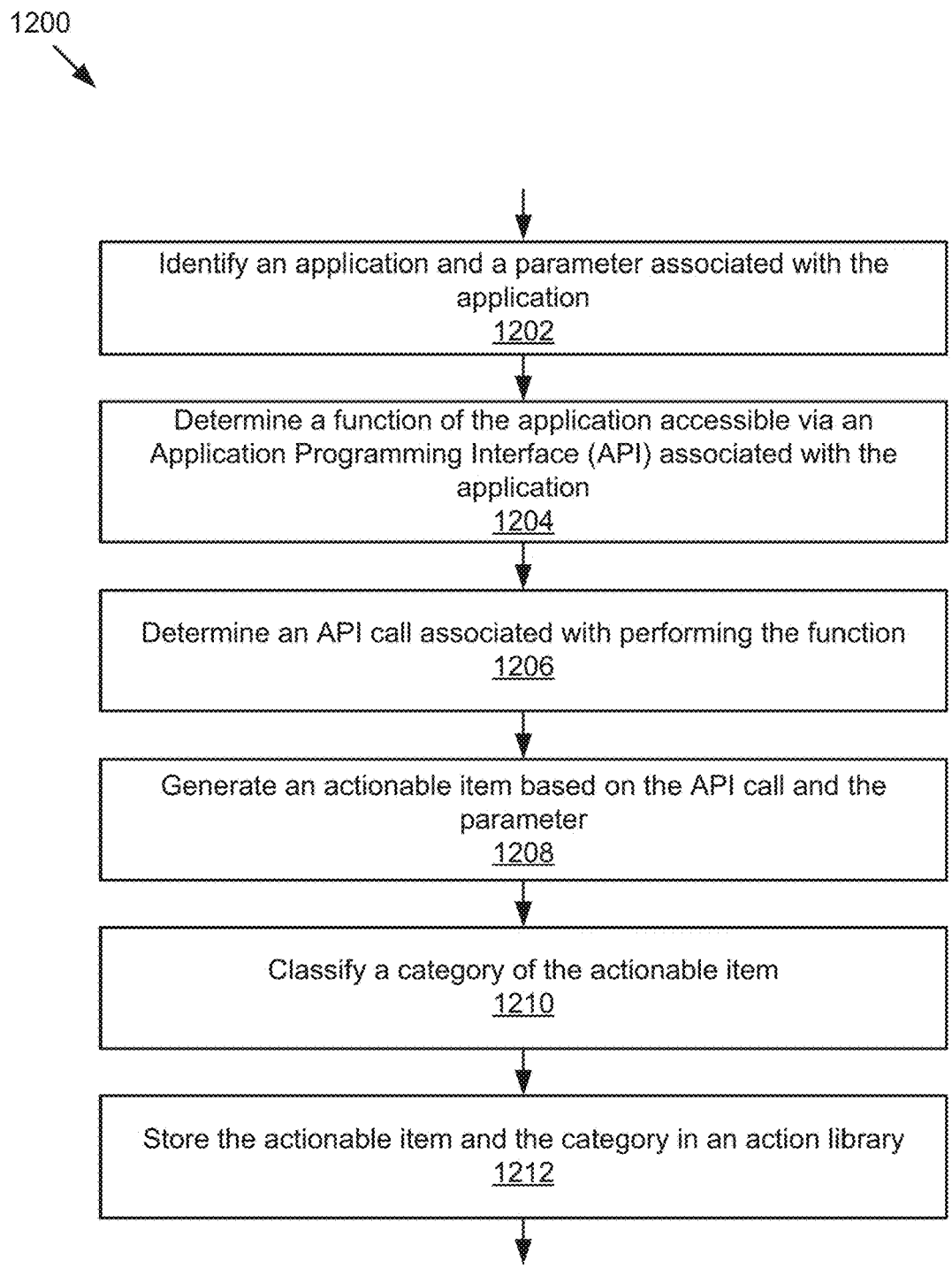
FIG. 12 is a flow diagram illustrating one embodiment of an example method for creating an action library.

FIG. 12 is a flow diagram illustrating one embodiment of an example method 1200 for creating an action library. At 1202, the archiver 202 identifies an application and a parameter associated with the application. The archiver 202 archives user interaction with applications on the mobile computing device 115. For example, the archiver 202 identifies that the user launched an email application, selected a contact named "Bob" in the address list, and sent an email message to the contact. At 1204, the action library curator 204 determines a function of the application accessible via an application programming interface (API) associated with the application. The action library curator 204 uses an API key to access the API 109 of the online service 111 associated with the application as shown in FIG. 1. If the API 109 accepts the API key as valid, the action library curator 204 uses an API to parse an application and determines its constituent functions, tasks, or activities. For example, the action library curator 204 determines that the constituent functions of an email application include create a new email message, set up an appointment, create a calendar invite, etc. At 1206, the action library curator 204 determines an application programming interface (API) call associated with performing the function. The API call can be used submit a request to the API 109 to perform a function of the application. The API 109 services the request of the API call. The request includes the parameters or data associated with performing the function. At 1208, the action library curator 204 generates an actionable item based on the API call and the parameter. The actionable item of an application may be a user interface element that links directly to an API call to automatically transmit a request to the API 109 of the online service 111 for performing a function, task or activity associated with the application. At 1210, the action library curator 204 classifies a category of the actionable item. For example, the action library curator 204 identifies actionable items for one or more fitness applications and groups the identified actionable items under a 'fitness' category. At 1212, the action library curator 204 stores the actionable item and the category in an action library.

Figure 13:
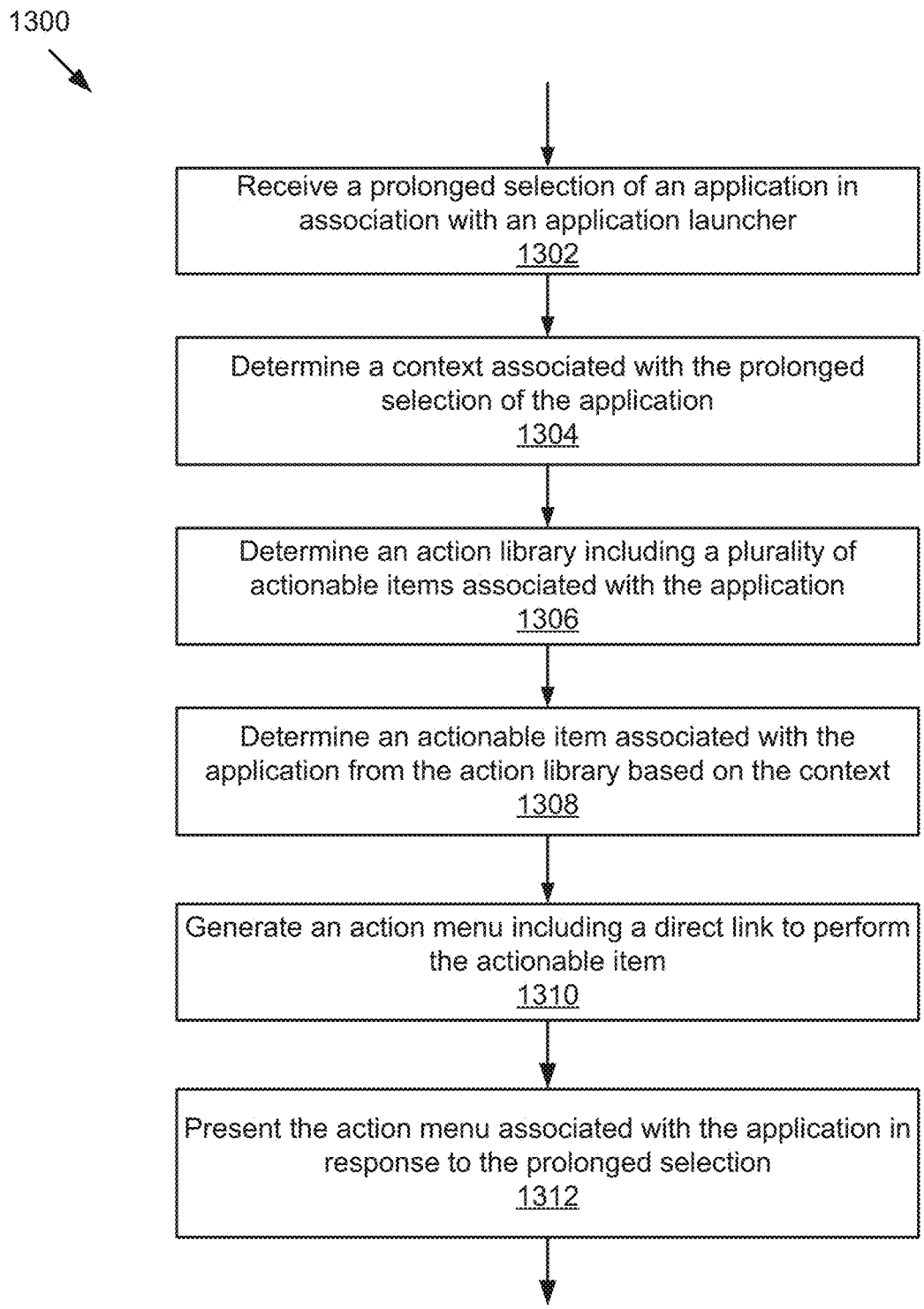
FIG. 13 is a flow diagram illustrating one embodiment of an example method for generating an action menu relating to an application.

FIG. 13 is a flow diagram illustrating one embodiment of an example method 1300 for generating an action menu relating to an application. At 1302, the processing engine 206 receives a prolonged selection of an application in association with an application launcher. At 1304, the context determiner 208 determines a context associated with the prolonged selection of the application. At 1306, the action recommender 210 determines an action library including a plurality of actionable items associated with the application. At 1308, the action recommender 210 determines an actionable item associated with the application from the action library based on the context. At 1310, the action recommender 210 generates an action menu including a direct link to perform the actionable item. For example, the function of the actionable item can be performed without launching the corresponding application. At 1312, the user interface engine 212 presents the action menu associated with the application in response to the prolonged selection.

Figure 14:
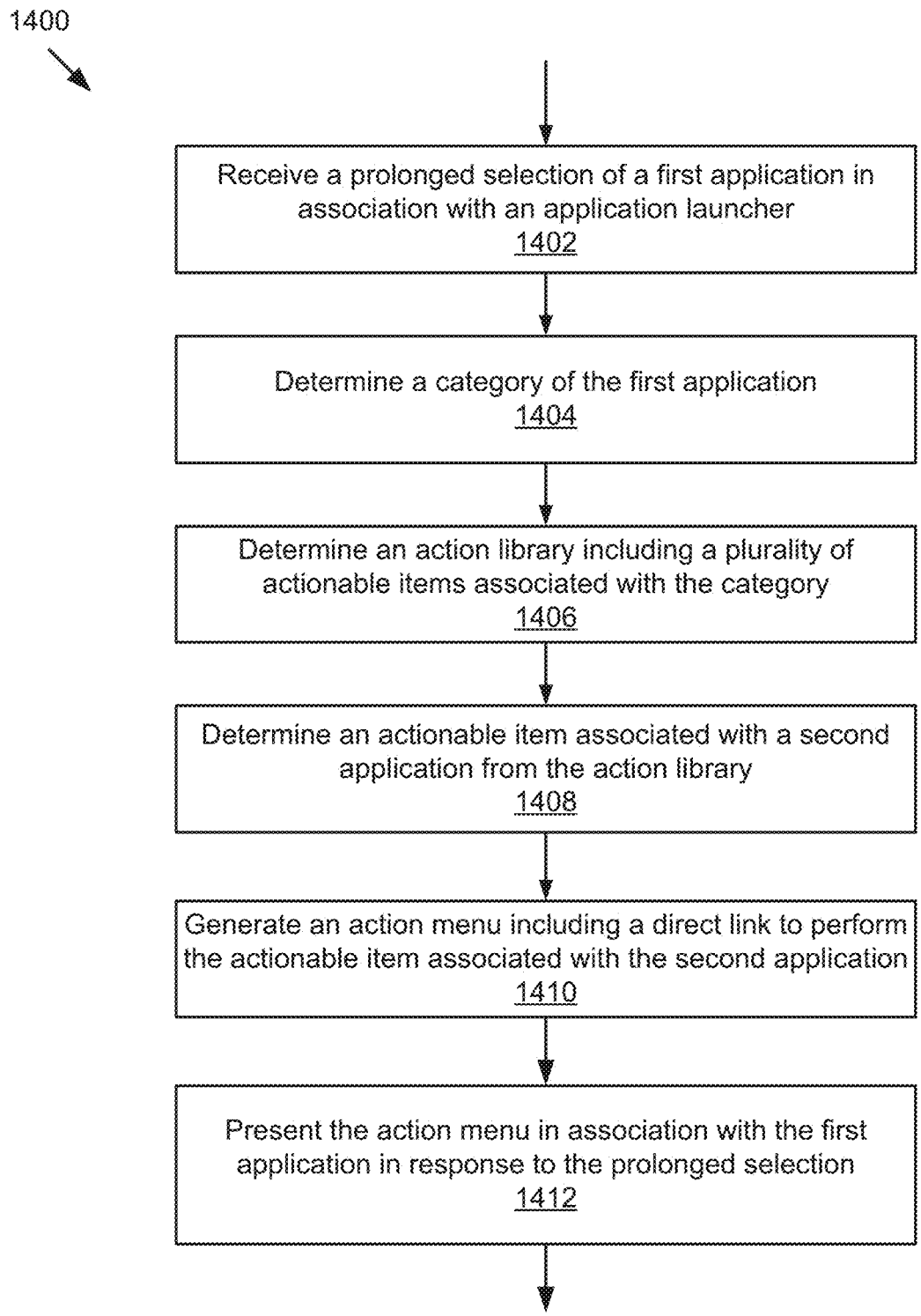
FIG. 14 is a flow diagram illustrating one embodiment of an example method for surfacing actionable items relating to a second application in the action menu of a first application.

FIG. 14 is a flow diagram illustrating one embodiment of an example method 1400 for surfacing actionable items relating to a second application in the action menu of a first application (cross-pollination of actions). At 1402, the processing engine 206 receives a prolonged selection of a first application in association with an application launcher. At 1404, the action recommender 210 determines a category of the first application. At 1406, the action recommender 210 determines an action library including a plurality of actionable items associated with the category. At 1408, the action recommender 210 determines an actionable item associated with a second application from the action library. At 1410, the action recommender 210 generates an action menu including a direct link to perform the actionable item associated with the second application. At 1412, the user interface engine 212 presents the action menu in association with the first application in response to the prolonged selection.

Figure 15:
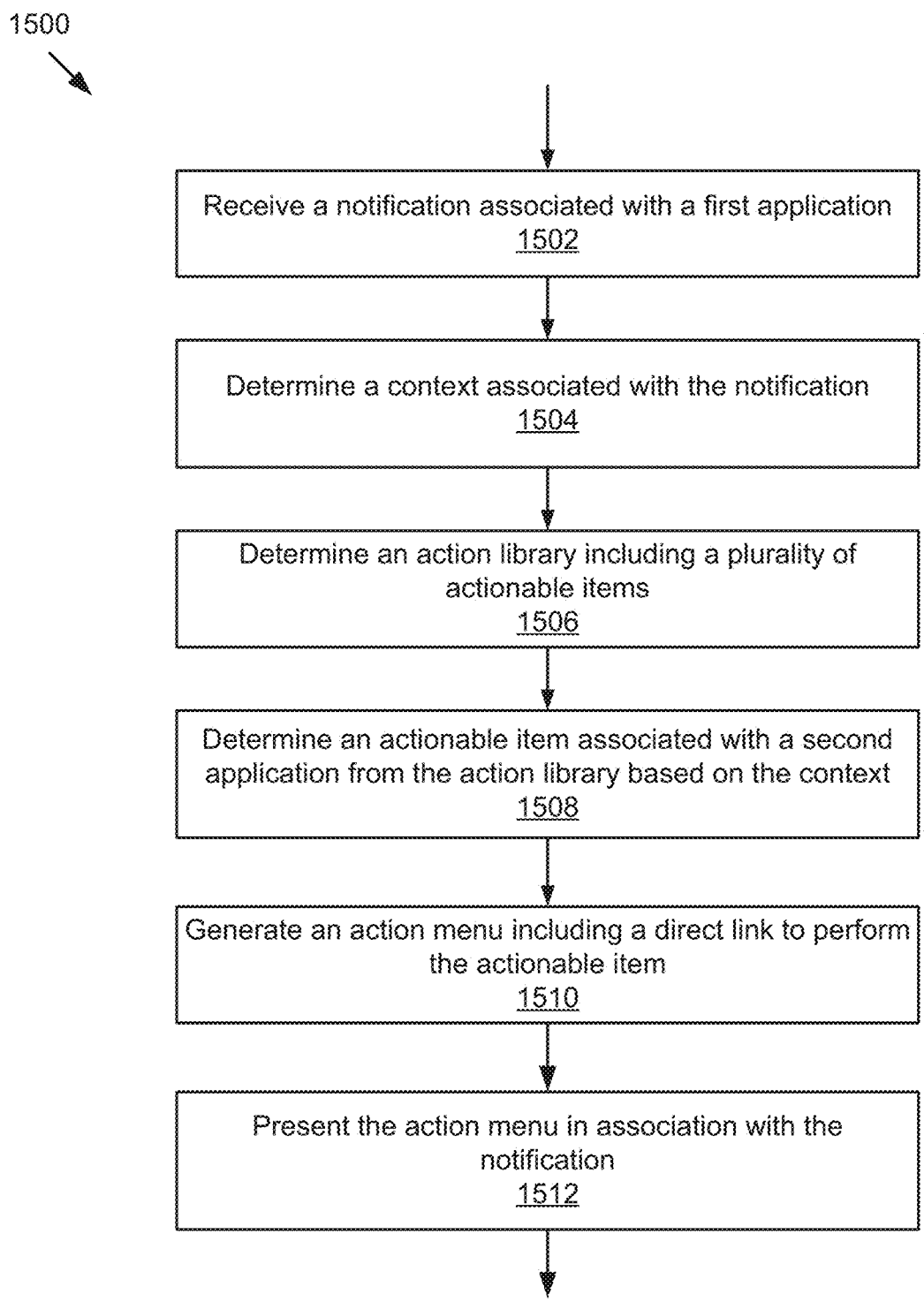
FIG. 15 is a flow diagram illustrating one embodiment of an example method for surfacing actionable items relating to a notification of an application in an action menu.

FIG. 15 is a flow diagram illustrating one embodiment of an example method 1500 for surfacing actionable items relating to a notification of an application in an action menu. At 1502, the processing engine 206 receives a notification associated with a first application. At 1504, the context determiner 208 determines a context associated with the notification. At 1506, the action recommender 210 determines an action library including a plurality of actionable items. At 1508, the action recommender 210 determines an actionable item associated with a second application from the action library based on the context. At 1510, the action recommender 210 generates an action menu including a direct link to perform the actionable item. At 1512, the user interface engine 212 presents the action menu in association with the notification.

Figure 16:
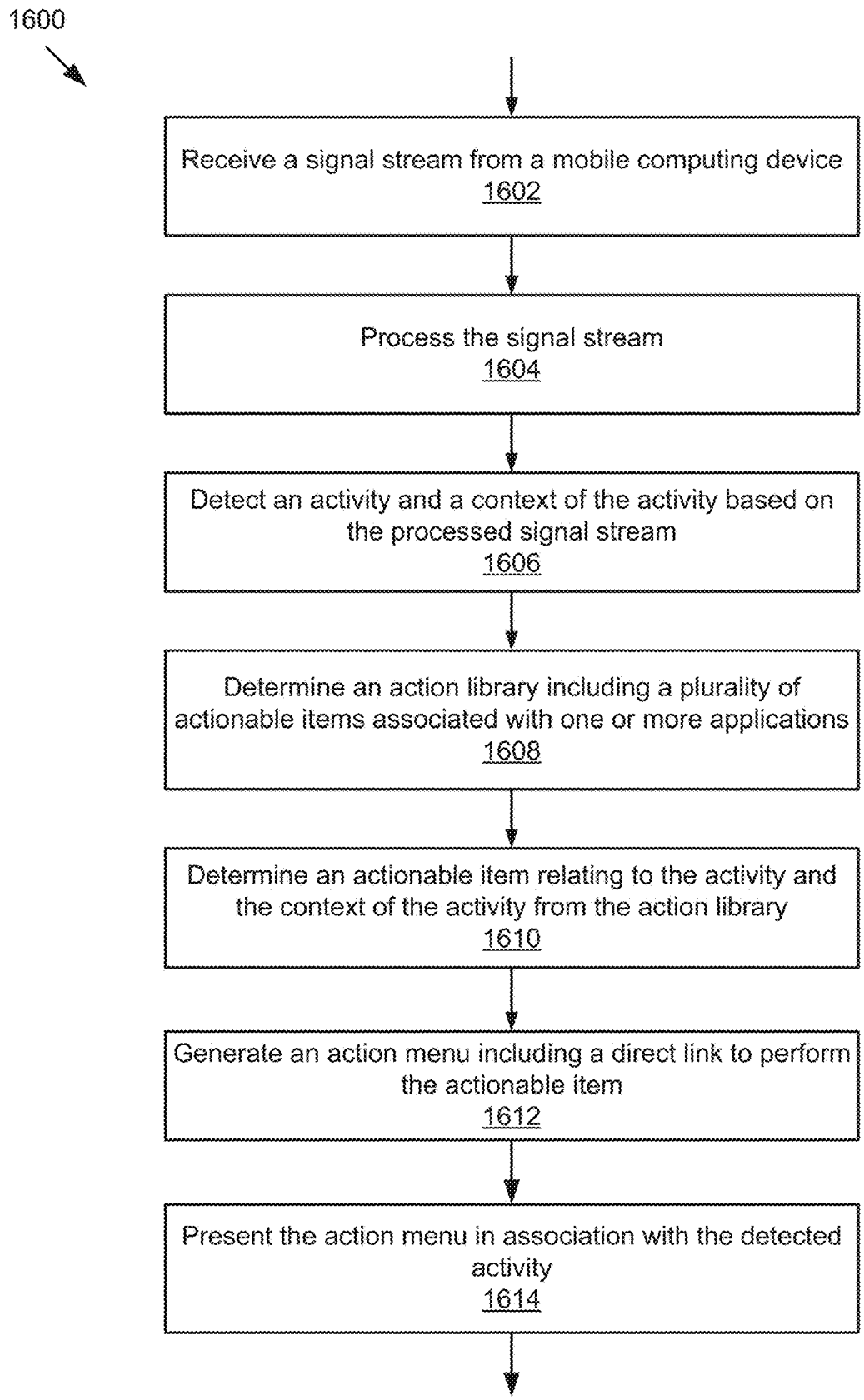
FIG. 16 is a flow diagram illustrating one embodiment of an example method for surfacing actionable items relating to a detected activity and associated context.

FIG. 16 is a flow diagram illustrating one embodiment of an example method 1600 for surfacing actionable items relating to a detected activity and associated context. At 1602, the processing engine 206 receives a signal stream from a mobile computing device. At 1604, the processing engine 206 processes the signal stream. At 1606, the context determiner 208 detects an activity and a context of the activity based on the processed signal stream. At 1608, the action recommender 210 determines an action library including a plurality of actionable items associated with one or more applications. At 1610, the action recommender 210 determines an actionable item relating to the activity and the context of the activity from the action library. At 1612, the action recommender 210 generates an action menu including a direct link to perform the actionable item. At 1614, the user interface engine 212 presents the action menu in association with the detected activity.

A system and method for surfacing tailored actionable items associated with applications in a user experience of a mobile computing device has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more processors, sensor data and application use data from a client device;
analyzing, using the one or more processors, the sensor data and the application use data to determine a contextual state of use of the client device;
determining, using the one or more processors, whether the contextual state of use of the client device is persisting for a threshold period of time when a first application is selected by a user on the client device;
responsive to determining that the contextual state of use of the client device is persisting for the threshold period of time when the first application is selected by the user on the client device, identifying, using the one or more processors, from an action library including a plurality of actionable items, a first actionable item of the first application using the contextual state of use as input to an action machine learning model, the action machine learning model being trained using a dataset corresponding to a demographic group to which the user belongs;
generating, using the one or more processors, a first action menu for the first application using the first actionable item responsive to identifying the first actionable item, the first actionable item including a first deep link to perform an action within the first application;
presenting, using the one or more processors, the first action menu in association with the first application while the first application is remaining unlaunched on the client device;
receiving, using the one or more processors, user selection of the first actionable item in the first action menu; and
responsive to receiving the user selection of the first actionable item, linking directly from the first action menu and past an interstitial page in the first application to a target page corresponding to performing the action on the client device.

2. The computer-implemented method of claim 1, further comprising determining the action library by:
identifying an application and a parameter associated with the application;
connecting with an application programming interface associated with the application;
determining a function of the application accessible via the application programming interface;
determining an application programming interface call associated with performing the function;
generating an actionable item for the application using the application programming interface call and the parameter;
classifying a category of the actionable item; and
storing the actionable item and the category of the actionable item in the action library.

3. The computer-implemented method of claim 1, wherein the first application is selected by the user using a prolonged selection of the first application in an application launcher and generating the first action menu further comprises:

determining a category of the first application;
identifying, from the action library, a second actionable item of a second application based on the category of the first application matching with the second actionable item;
adding the second actionable item to the first action menu for the first application, the second actionable item including a second deep link to perform an action within the second application; and
presenting the first action menu in association with the first application in response to the prolonged selection.

4. The computer-implemented method of claim 1, further comprising:
detecting an incoming notification for the first application on the client device;
determining a context of the incoming notification;
identifying, from the action library, a second actionable item of a second application based on the context;
generating a second action menu corresponding to the incoming notification using the second actionable item, the second actionable item including a second deep link to perform an action within the second application; and
presenting the second action menu in association with the incoming notification.

5. The computer-implemented method of claim 1, wherein the client device is a mobile computing device and further comprising:
receiving a signal stream from the mobile computing device;
processing the signal stream;
detecting a user activity and a context of the user activity based on the processed signal stream;
identifying, from the action library, a third actionable item of a third application based on the context; and
generating a third action menu corresponding to the context of the user activity using the third actionable item, the third actionable item including a third deep link to perform an action within the third application.

6. The computer-implemented method of claim 5, further comprising:
determining whether a duration of the detected user activity satisfies a predetermined threshold; and
responsive to determining that the duration of the detected user activity satisfies the predetermined threshold, generating a notification to surface the third action menu and presenting the notification in association with the detected user activity.

7. The computer-implemented method of claim 5, wherein generating the third action menu further comprises:
determining whether the third application is loaded on the mobile computing device; and
responsive to determining that the third application is unloaded on the mobile computing device, generating the third action menu to include a fourth link to load the third application on the mobile computing device.

8. The computer-implemented method of claim 1, further comprising:
responsive to receiving the user selection of the first actionable item, generating a secondary action screen for the first application and linking directly from the first action menu to the secondary action screen;
presenting the secondary action screen on the client device;
receiving user input in the secondary action screen to complete performing the action within the first application represented by the first actionable item; and performing the action of the first actionable item based on the user input.

9. The computer-implemented method of claim 1, wherein linking directly from the first action menu to the target page corresponding to performing the action skips a traversal of the interstitial page in the first application on the client device.

10. A system comprising:
one or more processors; and
a memory, the memory storing instructions, which when executed cause the one or more processors to:
receive sensor data and application use data from a client device;
analyze the sensor data and the application use data to determine a contextual state of use of the client device;
determine whether the contextual state of use of the client device is persisting for a threshold period of time when a first application is selected by a user on the client device;
responsive to determining that the contextual state of use of the client device is persisting for the threshold period of time when the first application is selected by the user on the client device, identify, from an action library including a plurality of actionable items, a first actionable item of the first application using the contextual state of use as input to an action machine learning model, the action machine learning model being trained using a dataset corresponding to a demographic group to which the user belongs;
generate a first action menu for the first application using the first actionable item responsive to identifying the first actionable item, the first actionable item including a first deep link to perform an action within the first application;
present the first action menu in association with the first application while the first application is remaining unlaunched on the client device;
receive user selection of the first actionable item in the first action menu; and
responsive to receiving the user selection of the first actionable item, link directly from the first action menu and past an interstitial page in the first application to a target page corresponding to performing the action on the client device.

11. The system of claim 10, wherein the instructions further cause the one or more processors to determine the action library, wherein the one or more processors are configured to:
identify an application and a parameter associated with the application;
connect with an application programming interface associated with the application;
determine a function of the application accessible via the application programming interface;
determine an application programming interface call associated with performing the function;
generate an actionable item for the application using the application programming interface call and the parameter;
classify a category of the actionable item; and
store the actionable item and the category of the actionable item in the action library.

12. The system of claim 10, wherein to generate the first action menu, the instructions further cause the one or more processors to:
determine a category of the first application;
identify, from the action library, a second actionable item of a second application based on the category of the first application matching with the second actionable item;
add the second actionable item to the first action menu for the first application, the second actionable item including a second deep link to perform an action within the second application; and
present the first action menu in association with the first application in response to an event, wherein the event is a prolonged selection of the first application in an application launcher.

13. The system of claim 10, wherein the instructions further cause the one or more processors to:
detect an incoming notification for the first application on the client device;
determine a context of the incoming notification;
identify, from the action library, a second actionable item of a second application based on the context;
generate a second action menu corresponding to the incoming notification using the second actionable item, the second actionable item including a second deep link to perform an action within the second application; and
present the second action menu in association with the incoming notification.

14. The system of claim 10, wherein the client device is a mobile computing device and the instructions further cause the one or more processors to:
receive a signal stream from the mobile computing device;
process the signal stream;
detect a user activity and a context of the user activity based on the processed signal stream;
identify, from the action library, a third actionable item of a third application based on the context; and
generate a third action menu corresponding to the context of the user activity using the third actionable item, the third actionable item including a third deep link to perform an action within the third application.

15. The system of claim 14, wherein the instructions further cause the one or more processors to:
determine whether a duration of the detected user activity satisfies a predetermined threshold; and
responsive to determining that the duration of the detected user activity satisfies the predetermined threshold, generate a notification to surface the third action menu and present the notification in association with the detected user activity.

16. The system of claim 14, wherein to generate the third action menu, the instructions further cause the one or more processors to:
determine whether the third application is loaded on the mobile computing device; and
responsive to determining that the third application is unloaded on the mobile computing device, generate the third action menu to include a fourth link to load the third application on the mobile computing device.

17. The system of claim 10, wherein the instructions further cause the one or more processors to:
responsive to receiving the user selection of the first actionable item, generate a secondary action screen for the first application and linking directly from the first action menu to the secondary action screen;
present the secondary action screen on the client device;

receive user input in the secondary action screen to complete performing the action within the first application represented by the first actionable item; and perform the action of the first actionable item based on the user input.

18. The system of claim 10, wherein linking directly from the first action menu to the target page corresponding to performing the action skips a traversal of the interstitial page in the first application on the client device.

19. A computer-implemented method comprising:
receiving, using one or more processors, sensor data and application use data from a mobile computing device of a user;
analyzing, using the one or more processors, the sensor data and the application use data to determine an activity of the user and a context of the activity;
determining, using the one or more processors, whether the context of the activity is persisting for a threshold period of time;
responsive to determining that the context of the activity is persisting for the threshold period of time, determining, using the one or more processors, an actionable item using the activity of the user and the context of the activity as input to an action machine learning model and an action library including a plurality of actionable items of one or more applications, the action machine learning model being trained using a dataset corresponding to a demographic group to which the user belongs;
generating, using the one or more processors, an action menu using the actionable item, the actionable item including a direct link to perform an action within an application represented by the actionable item;
presenting, using the one or more processors, the action menu in association with the determined activity while the application is remaining unlaunched on the mobile computing device;
receiving, using the one or more processors, a selection by the user of the actionable item in the action menu; and
responsive to receiving the selection by the user of the actionable item in the action menu, linking directly from the action menu and past an interstitial page in the application to a target page corresponding to performing the action on the mobile computing device.

20. A computer-implemented method comprising:
receiving, using one or more processors, sensor data and application use data from a client device;
analyzing, using the one or more processors, the sensor data and the application use data to determine a contextual state of use of the client device;
determining, using the one or more processors, whether the contextual state of use of the client device is persisting for a threshold period of time when a prolonged selection of a first application from a user is received on an application launcher on the client device;
responsive to determining that the contextual state of use of the client device is persisting for the threshold period of time, determining, using the one or more processors, a first actionable item of the first application and a second actionable item of a second application using the contextual state of use as input to an action machine learning model and an action library including a plurality of actionable items, the action machine learning model being trained using a dataset corresponding to a demographic group to which the user belongs and the first application and the second application corresponding to a same category;
generating, using the one or more processors, an action menu for the first application using the first actionable item and the second actionable item responsive to determining the first actionable item and the second actionable item, the first actionable item including a first deep link to perform a first action within the first application and the second actionable item including a second deep link to perform a second action within the second application;
presenting, using the one or more processors, the action menu in association with the first application while the first application and the second application are remaining unlaunched on the application launcher of the client device;
receiving, using the one or more processors, user selection of one of the first actionable item and the second actionable item in the action menu; and
responsive to receiving the user selection of one of the first actionable item and the second actionable item, linking directly from the action menu and past an interstitial page in one of the first application and the second application to a target page corresponding to performing one of the first action and the second action on the client device.

* * * * *